United States Patent [19]

Klontz et al.

[11] Patent Number: 5,301,096

[45] Date of Patent: * Apr. 5, 1994

[54] SUBMERSIBLE CONTACTLESS POWER DELIVERY SYSTEM

[75] Inventors: Keith W. Klontz, Sun Prairie; Deepakraj M. Divan, Madison; Donald W. Novotny, Madison; Robert D. Lorenz, Madison, all of Wis.

[73] Assignee: Electric Power Research Institute, Palo Alto, Calif.

[*] Notice: The portion of the term of this patent subsequent to Oct. 20, 2009 has been disclaimed.

[21] Appl. No.: 963,703

[22] Filed: Oct. 20, 1992

Related U.S. Application Data

[63] Continuation-in-part of Ser. No. 767,024, Sep. 27, 1991.

[51] Int. Cl.$^5$ .................. H02M 5/293; H02J 7/00
[52] U.S. Cl. .......................... 363/37; 320/2; 320/21; 336/118; 336/175; 336/DIG. 2
[58] Field of Search .............. 363/37; 336/118, 119, 336/129, 175, 176, 178, DIG. 2; 362/164, 391; 324/392, 395, 402; 320/2, 21

[56] References Cited

U.S. PATENT DOCUMENTS

| | | |
|---|---|---|
| 1,827,191 | 10/1931 | Casper . |
| 1,844,501 | 2/1932 | Davis . |
| 2,175,363 | 10/1939 | Roberts . |
| 2,181,899 | 12/1939 | Kennedy . |
| 2,348,325 | 5/1944 | Brown . |
| 2,375,591 | 5/1945 | Schweitzer, Jr. . |
| 2,382,435 | 8/1945 | Mann et al. . |
| 2,430,640 | 11/1947 | Johnson . |
| 2,669,603 | 2/1954 | Prache . |
| 3,005,965 | 10/1961 | Wertanen . |
| 3,066,266 | 11/1962 | Fisher . |
| 3,195,076 | 7/1965 | Morrison . |
| 3,197,723 | 7/1965 | Dortort . |
| 3,260,977 | 7/1966 | Coltman . |
| 3,263,191 | 7/1966 | Arvonio et al. . |
| 3,449,703 | 6/1969 | Steen . |
| 3,453,574 | 7/1969 | de Parry . |
| 3,870,942 | 3/1975 | Boese et al. . |
| 3,996,543 | 12/1976 | Conner et al. . |
| 4,386,280 | 5/1983 | Ricaud et al. . |
| 4,496,821 | 1/1985 | Burgher et al. . |
| 4,656,412 | 4/1987 | McLyman . |
| 4,901,069 | 2/1990 | Veneruso . |
| 4,913,258 | 4/1990 | Sakurai et al. . |
| 4,953,726 | 9/1990 | Loutan . |

OTHER PUBLICATIONS

HLN Weigemann, D. W. Novotny, D. M. Divan, R. Mohan, "A ZVS Dual Resonant Converter for Battery Charging Applications," Power Electronics Specialists Conference, 1991.

F. C. Schwarz, J. B. Klaassens, "Controllable 45-kW Current Source for DC Machines," IEEE Transactions Industry Applications, vol. IA-15, No. 4, Jul./Aug., 1979, pp. 437–444.

D. M. Divan, G. Venkataramanan, R. DeDoncker, "Design Methodologies for Soft Switched Inverters," IEEE-IAS 1988 Conference Record, pp. 758–766.

(List continued on next page.)

Primary Examiner—Emanuel T. Voeltz
Attorney, Agent, or Firm—Klarquist, Sparkman, Campbell, Leigh & Whinston

[57] ABSTRACT

A submersible contactless power transfer system, especially for powering underwater electric loads, including movable loads, such as underwater vehicles, elevators, or worksite equipment. A converter supplies high frequency power to a conductor loop. A coupling sheath or link has a core-mounted conductor at least partially surrounded by a magnetic core which slidably receives a portion of the conductor loop within the link. An optional secondary converter converts power from the core-mounted conductor to meet the load requirements. A contactless power distribution system is submersible to deliver power to underwater loads through clamped-on or captive links attached at any location along the conductor loop. Methods are also provided of powering loads submersed in water, including seawater, or other non-magnetic liquid mediums.

20 Claims, 10 Drawing Sheets

OTHER PUBLICATIONS

J. M. Hillhouse, "EV's Downunder-Electric Vehicles in Mining," 10th International Electric Vehicle Symposium, Hong Kong, Dec. 1990.

A. Esser, H. C. Skudelny, "A New Approach to Power Supplies for Robots," *IEEE Transactions on Industry Applications*, vol. 27, No. 5, Sep./Oct., 1991, pp. 872-875.

K. W. Klontz, D. M. Divan, D. W. Novotny, R. D. Lorenz, "Contactless Power Delivery for Mining Applications," *IEEE-IAS 1991 Conference Record*, pp. 1263-1269.

E. T. Bowers, "Safety Aspects of Pneumatic Transport," Bureau of Mines Information Circular No. 9006, U.S. Dept. of Interior, pp. 6-20, 1985.

K. Lashkari, S. E. Schladover, and E. H. Lechner, "Inductive Power Transfer to an Electric Vehicle," 8th International Electric Vehicle Symposium, Washington, D.C., Oct. 1986.

E. H. Lechner and S. E. Schladover, "The Roadway Powered Electric Vehicle-An All-electric Hybrid System," 8th International Electric Vehicle Symposium, Washington, D.C., Oct. 1986.

S. E. Schladover, "Systems Engineering of the Roadway Powered Electric Vehicle Technology," 9th International Electric Vehicle Symposium, Toronto, Ont. Canada, Nov. 1988.

M. H. Kheraluwala, D. W. Novotny, D. M. Divan, "Design Considerations for High Frequency Transformers," *IEEE-PESC-90 Record*, pp. 734-742.

M. S. Rauls, D. W. Novotny, and D. M. Divan, "Design Considerations For High Frequency Co-Axial Winding Power Transformers," *IEEE-IAS 1991 Conference Record*, Oct., 1991, pp. 946-952.

FIG. 5
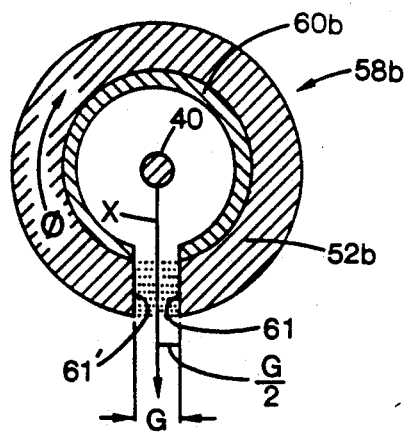
FIG. 6
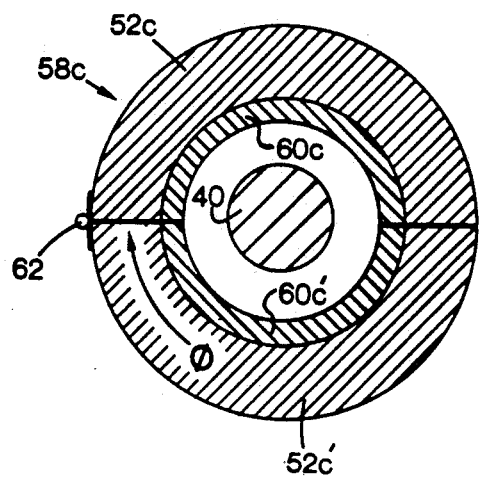
FIG. 7
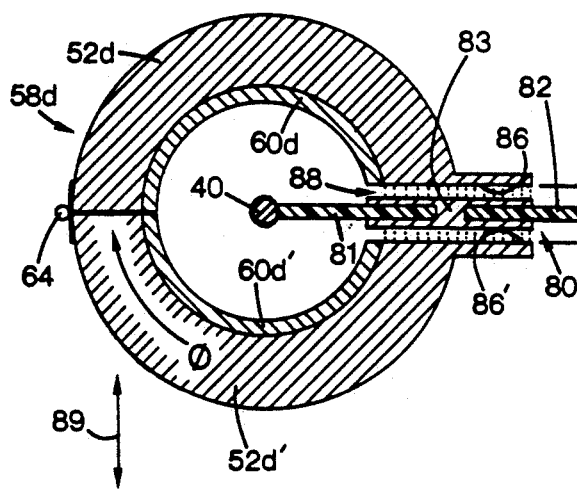
FIG. 8
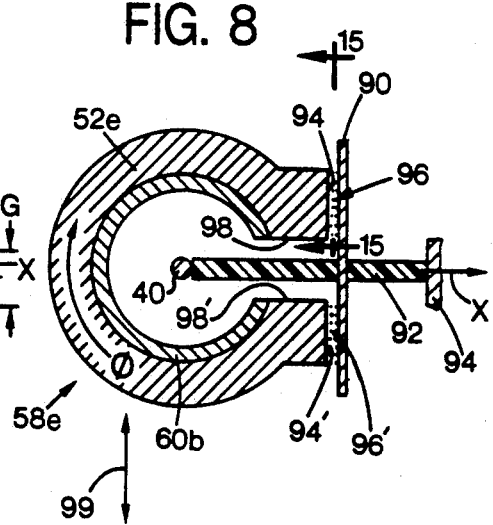
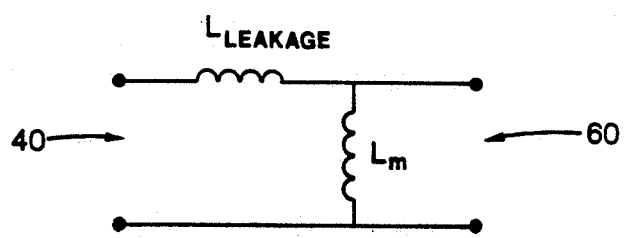
FIG. 9

1 = primary
2 = secondary
i = inner
o = outer
c = core
ins = insulation 5,301,096

SUBMERSIBLE CONTACTLESS POWER DELIVERY SYSTEM

BACKGROUND OF THE INVENTION

This application is a continuation-in-part of co-pending application Ser. No. 07/767,024, filed Sep. 27, 1991, having the same inventors, and which is hereby incorporated by reference. Also on Sep. 27, 1991, the same inventors filed U.S. patent application Ser. No. 07/766,756, which issued on Oct. 20, 1992, as U.S. Pat. No. 5,157,319, entitled "Contactless Battery Charging System." The '319 patent discloses a contactless recharging system and method for charging an energy storage device, such as one on-board an electric vehicle, using a coupling link, which may be constructed in one of the forms described further below.

The present invention relates generally to systems for delivering power from an electrical source to an electric load, including delivery when there is relative motion between the source and the load, and more particularly to an improved submersible contactless power delivery and/or distribution system, and to methods for accomplishing this submersed power transfer without contact of primary and secondary windings, such as may be used in underwater electric vehicles, elevators, temporary work sites, oceanographic study and the like.

There are several important applications where the ability to transfer power under water can significantly affect performance capabilities. For example, submersible vehicles cannot generate energy under water through internal combustion which expends precious oxygen. The most common method of supplying power to submersible vehicles involves using on-board batteries for energy storage. Battery capacity then becomes the major limitation for non-nuclear submersible vehicles, both in terms of mission length and performance of energy intensive tasks.

The problem of supplying energy to land-based electric vehicles while they are moving on a roadway has been considered difficult to solve. In the past, systems transferring large amounts of electrical power, such as up to one megawatt, to a moving load have traditionally used means that are unreliable, inefficient, and potentially unsafe, such as sliding or rolling metal contacts, sliding carbon brushes trailing cables. For example, pantograph sliding contacts have been used extensively for trolleys and urban transit systems traveling on rails. However, these railway traction systems are not a viable consideration for underwater use because water, and especially salinated seawater, conducts electricity, whereas air, to a point, acts as an insulator. Additional problems include wear, corrosion, reliability and maintenance of sliding mechanical contact systems.

Recently, some of these problems have been mitigated in land-based systems using inductively coupled flat coils in combination with power electronics to transfer power from a fixed source to a moving vehicle. For example, the following three articles propose various systems having a fixed primary winding buried in a roadway along which electric vehicles travel: K. Lashkari, S.E. Schladover, and E.H. Lechner, "Inductive Power Transfer to an Electric Vehicle," 8th International Electric Vehicle Symposium, Washington, DC, October, 1986; E.H. Lechner and S.E. Schladover, "The Roadway Powered Electric Vehicle— An All-electric Hybrid System," 8th International Electric Vehicle Symposium, Washington, DC, October, 1986; and S.E. Schladover, "Systems Engineering of the Roadway Powered Electric Vehicle Technology" 9th International Electric Vehicle Symposium, Toronto, Ont. Canada, November, 1988. However, these systems suffer a variety of drawbacks, including the need for embedded coils along the path of travel, mandatory fast and accurate air gap control, and the requirement of two large flux collection or conduction surfaces. Each of these drawbacks seriously impacts on the economic practicality of these systems, as well as their practicality for underwater applications.

As a specific example, the State of California is considering an electric vehicle highway proposal for contactless distribution of power to moving vehicles. In the California approach, cables are buried in the roadway and energized. The vehicle carries an induction coil which receives induced current for use in propulsion and battery recharging. The California system uses a positioning control on the vehicle to maintain the distance between the two flux collection surfaces of the buried cable and the coil to within five centimeters to provide sufficient power pickup.

The California system has several drawbacks. For example, the normal attractive forces between the vehicle and the buried cable can reach high levels during the required power transfer. The attractive forces also increase the frictional forces required to move the vehicle along the roadway. The controller must counter these attractive forces by positioning the vehicle-mounted collector above the roadway surface. Additionally, the magnetic coupling between the cable and coil in the California system is poor due to the large air gap, yielding poor efficiency, low power/weight density (i.e., kilowatts per kilogram), and poor utilization of core material. To compensate for the large air gap space between the vehicle-mounted secondary collector and the buried primary conductor a very large primary converter is required to power the buried conductor. To improve the magnetic coupling, the roadway cable must be buried with significant amounts of magnetic core material, which greatly increases the initial and operating costs of the California system.

While the problem of power delivery to moving electric loads in land-based applications is interesting, the problem of power delivery under water is tremendously more challenging.

Thus, a need exists for an improved manner of delivering power underwater from a source to an electric load, especially where there is relative motion between the source and the load, such as may be used in underwater construction, mining, and electrical vehicle applications, which is directed toward overcoming, and not susceptible to, the above limitations and disadvantages.

SUMMARY OF THE INVENTION

In accordance with an illustrated embodiment of the present invention, a contactless power delivery system is provided for delivering power between first and second conductors to provide a flexible power delivery system for arcless coupling in hazardous and other environments, such as in underwater applications. This contactless power delivery system also delivers power when there is relative motion, i.e. linear and/or rotational, between first and second conductors. The first conductor at least partially surrounds a portion of the second conductor, and a magnetic core at least partially surrounds a portion of the first conductor so as to transfer power between the first and second conductors by magnetic induction. This power transfer occurs independent of the position and motion of the second conductor relative to the first Either the first or second conductor may serve as the primary winding and the other as the secondary winding. Methods are also provided of powering a movable electric load or a stationary load from a movable source, and of distributing power to a plurality of portable electric loads.

An overall object of the present invention is to provide an improved contactless manner of delivering power underwater from a source to an electric load.

A further object of the present invention is to provide an improved contactless power delivery system and method for delivering power underwater to movable submerged electric loads.

Another object of the present invention is to provide an improved flexible underwater power distribution system.

An additional object of the present invention is to provide a safer, more reliable, efficient and economic system for transferring power underwater between a source and an electrical load.

Still another object of the present invention is to improve underwater study, mining and exploration capabilities.

The present invention provides the ability to deliver great quantities of electrical power underwater across large water-filled gaps, conventionally referred to in land-based systems as "air gaps," during relative motion between the source and the load. Underwater contactless power delivery is accomplished by magnetic induction across a submerged radial interwinding space (described below). Furthermore, significant economic advantages may be obtained by using high operating frequencies with this contactless power transfer scheme. The contactless power delivery system is not sensitive to interwinding clearance between the primary and secondary conductors, leaving the system essentially unaffected by the position of the conductor within the core window. Furthermore, this underwater contactless power delivery is unhampered by linear and rotational motion of the coupling link when traveling along the length of the fixed conductor.

The present invention relates to the above features and objects individually as well as collectively. These and other objects, features and advantages of the present invention will become apparent to those skilled in the art from the following description and drawings.

BRIEF DESCRIPTION OF THE DRAWINGS

FIG. 5 is a radial sectional view of one form of coupling link of the present invention having a core with a gap in the flux path;

FIG. 6 is a radial sectional view of one form of a split hinged coupling link of the present invention having a core with a minimal air gap in the flux path during operation;

FIG. 7 is a radial sectional view of one form of a coupling link of the present invention having a split hinged core with a gap in the flux path and an enhanced core;

FIG. 8 is a radial sectional view of an alternate form of a coupling link of the present invention having a split core with a gap in the flux path and an enhanced core;

FIG. 9 is a schematic diagram of an equivalent circuit of a coupling link of the present invention surrounding a conductor;

DETAILED DESCRIPTION OF PREFERRED EMBODIMENTS

FIGS. 1-4 illustrate a general embodiment of a contactless power delivery system 30 constructed in accordance with the present invention for delivering power from an electric source 32 to an electric load indicated generally as 34, with a specific embodiment of a movable electric load indicated as 34'. The system 30 is discussed in general terms, first for a land-based system, and then in expanded terms, for an underwater contactless power delivery system 300 (see FIG. 17). Most of the explanations for the air-based system 30 apply equally to the submerged system 300.

The source 32 may alternating current (AC) power or direct current (DC) power, or a combination of AC and DC power. For a land-based system, typically the source 32 is a utility system providing AC power at a line frequency, for example, 60 Hz in the United States. The electrical load 34 may take on a variety of configurations including: autonomous electric vehicles requiring a power boost or recharge; haulage and conveying equipment, such as may be used in mining; batteries requiring recharging, including when in motion; linearly moving loads in a captive path, such as in elevators, conveyors and the like; robotic arms having continuously rotating joints or requiring linear motion in synchronism with a conveyor line; portable electric loads where flexibility is a priority, such as progressive loads in mine face and construction site applications; temporary work sites where quick setup is a priority, such as in military or naval applications; and undersea loads or loads located in other non-magnetic liquids. Several specific examples are discussed further below with reference to FIG. 17.

This list of examples for the electric load 34 is provided merely by way of illustration, and it is apparent that many other applications may find the contactless power delivery system 30 described herein to be of use. For example, while the illustrated embodiments initially discuss power transfer from a fixed primary to a moving secondary, it is apparent that the primary and secondary may be reversed. Thus, power flow from a moving source 32' to a stationary load 34 is also within the scope of the present invention, as well as receiving power from underwater generation, rather than just power delivery from a surface source to a submersed load. It is also apparent that the relative motion of the primary and secondary illustrated herein may be due to linear and/or rotary motion of either component with respect to the other. The actual values for the parameters discussed herein will of course vary by application, and the values shown here are given only by way of example.

Figure 1:
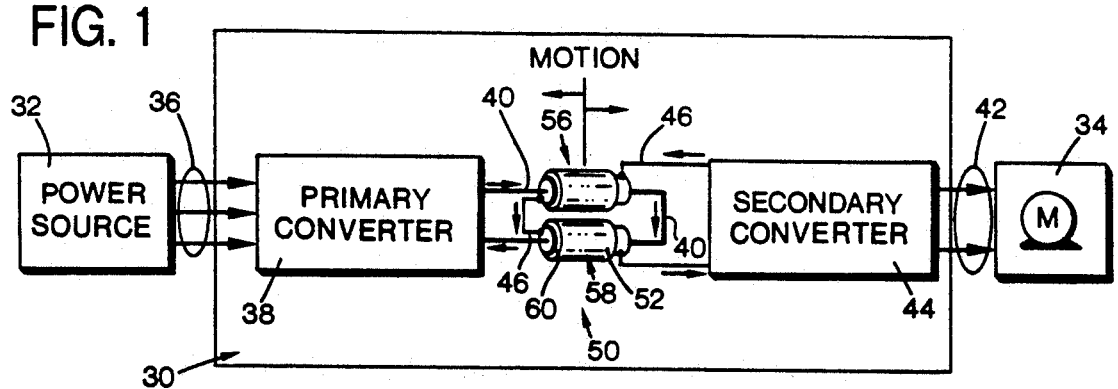
FIG. 1 is a schematic block diagram of one form of a contactless power delivery system of the present invention.

Referring specifically to FIG. 1, primary conductors 36 couple a primary-side converter 38 to the electrical source 32 which may be a three phase AC source, a single phase or other polyphase source or a DC source. The system described herein may operate totally at the line frequency of the AC source 32. However, it is preferred to gain additional operating efficiencies, desirable performance attributes, and marketable useful configurations by using the primary converter 38 to increase the frequency of operation, for instance on the order of 400 to 5,000 Hz, depending upon the most cost effective type of converter, and the inductance of the circuit as seen by the primary converter. As a practical example, to construct economic devices, there are tradeoffs between the device cost, switching frequencies, and loss considerations due to heating and the like. The frequency of operation generally decreases as the power rating increases, based upon these economic concerns. A specific embodiment of a primary converter 38 is discussed in greater detail below (see FIG. 13). The high frequency AC output of the primary converter 38 is supplied to a primary conductor or primary loop 40.

In the illustrated embodiments, conductors 42 deliver power from an optional secondary-side converter 44 to the load 34. The secondary converter 44 receives power through a secondary conductor or secondary loop 46 in a manner described in further detail below. Various types of secondary converter designs may be used, ranging from simple to complex as required by the particular application. In some applications, the secondary converter 44 may be used to condition the power to the load 34 in terms of voltage or current regulation, phase change, voltage boost or frequency control, such as to provide power to load 34 at a desired AC frequency, or as direct current (DC) power. The secondary converter 44 may also provide inner loop control, such as by processing feedback from the load, as opposed to outer loop control involving feedback to the primary converter 38. An illustrated embodiment for the optional secondary converter 44 is discussed further below (see FIG. 14).

Power is delivered from the primary conductor 40 to the secondary conductor 46 by a slidable coupling device, such as a link or coupling sheath 50. The core 52 may be of a ferromagnetic material, such as a conventional silicon steel or an amorphous steel. The core 52 may be segmented and hinged or have flux path air gaps as described further below. The primary loop 40 is slidably received within link 50.

FIGS. 1–4 illustrate the link 50 as a dual link having two identical link members 56 and 58. The primary loop 40 has power flow sending and return portions 40' and 40", respectively. The first link member 56 is slidably received on the sending conductor 40', and the second link member 58 is slidably received on the return portion 40". Other embodiments described further below illustrate a single link member, such as 58, coupled with a single primary conductor. The selection of a single member or dual members for the link 50 depends upon the particular application in which the contactless system 30 is used, as well as various optimization techniques employed to provide the most efficient and economical unit for a given application.

The secondary conductor 46 includes a core-mounted secondary winding 60 which may be a tubular copper member 60, substantially surrounded by core 52. Alternatively, it is apparent that the secondary winding 60 may also be comprised of a plurality of discrete elements evenly distributed about the inner surface of the core to provide a uniform distribution of current. The secondary winding 60 may be split or segmented into at least two tubular members separable from one another and configured to join one another in a longitudinal direction. Alternatively, the secondary winding 60 may be C-shaped or U-shaped in radial cross section.

The secondary winding 60 and core 52 are defined as being substantially concentric about a longitudinal axis Y. For example, referring to FIG. 2, the link member 56 has a longitudinal axis $Y_1$, and link member 58 has a longitudinal axis $Y_2$. In the illustrated ideal situation, the conductor 40 is located concentrically within the secondary winding 60 and the core 52, and therefore has a longitudinal axis colinear with the longitudinal axes of the link members 56, 58. The term "contactless" as used herein means without any electrical contact between the primary and secondary windings, other than magnetic coupling between the windings.

Figure 3:
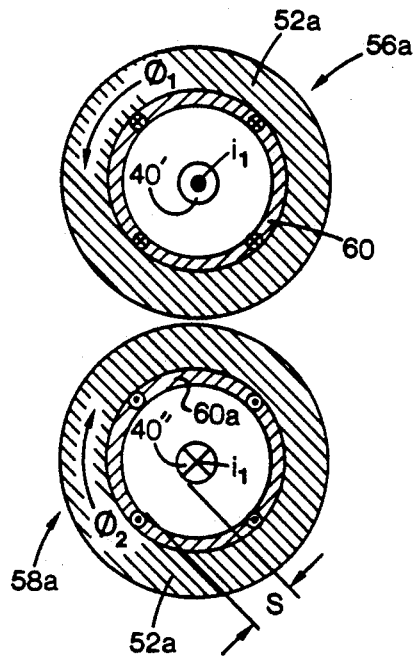
FIG. 3 is a side elevational view taken along lines 3—3 of FIG. 2.
Figure 4:
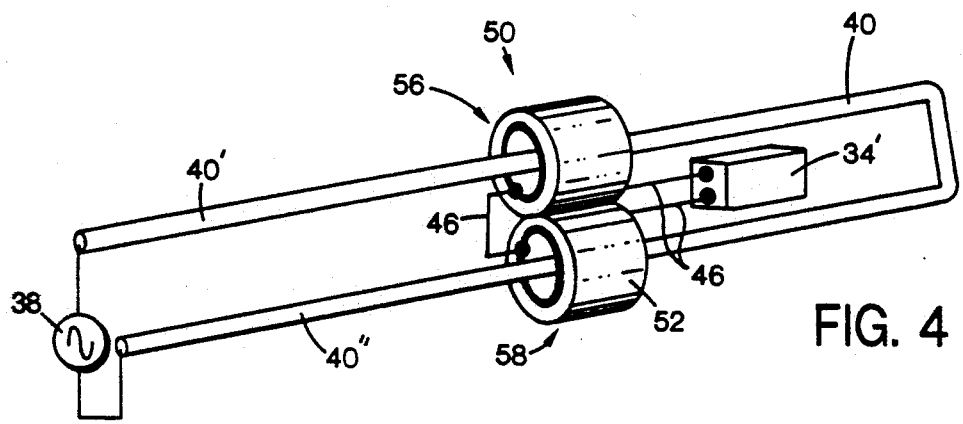
FIG. 4 is a combined schematic and perspective view of one form of a dual link of the present invention having a movable secondary load.

In FIG. 3, the current flow of the primary and secondary current is illustrated schematically. The current through conductor segment 40' moves out of the paper as indicated by the dot (arrowhead) therein, and the current through conductor 40" passes into the paper as indicated by the X (arrow tail) therein. Similar conventions are used at four locations about the periphery of the secondary conductor 60 to schematically indicate the direction of current flow therethrough.

In discussing the one possible theory of operation for the illustrated embodiment, the assumption is that the power flows from the fixed primary conductor 40 to the movable secondary conductor 60 of link 50. It is also equally possible to have power generated by the movable load and transferred from the outer winding 60 to the inner winding 40 (see FIG. 18), or to have the secondary conductor moving and the link fixed. As used herein, the term "fixed" refers to being secured in a relatively singular location, although it is apparent that the fixed member may flex or move somewhat as required or directed during operation.

Figure 16:
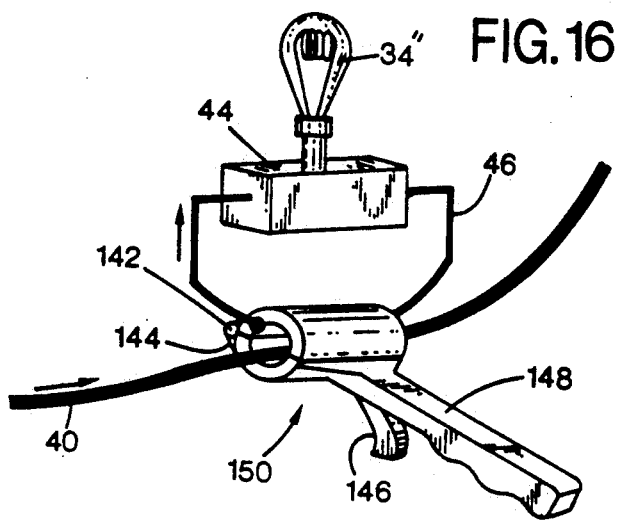
FIG. 16 is a perspective view of a portion of one form of a flexible power distribution system of the present invention.

To illustrate the concepts of the present invention, the contactless power delivery system 30 is described herein for two basic embodiments, one for a mobile electric load 34' (see FIGS. 17-19), and the other for a clamp-on link 34 used for power distribution (see FIG. 16). For example, the link 50 moves with the moving load 34' and requires radial clearance, referred to herein as an "interwinding space" S shown in FIG. 3.

The interwinding space S is distinct from an "air" gap G in the flux path of core 52, as shown in FIG. 5. The term "air gap" as used herein refers not only to air, but to any non-magnetic gaseous or liquid medium, such as seawater, flowing through the gap G, and comprising the environment in which link 50 travels or is located.

Thus, the link 50 with primary conductor 40 inserted therein provides a generally coaxial arrangement. This coaxial nature yields low leakage inductance which enables the us of high frequencies in the contactless system 30, and results in high power densities. The distributed current of the secondary winding 60 surrounds the current of the inner primary conductor 40, and has been given the name "coaxial winding transformer" or "CWT" by the inventors of the present invention. Furthermore, coaxial winding transformer theory may be used to analyze link 50 with loop 40 passing therethrough, and for convenience this arrangement is sometimes referred to herein as a CWT. The various transformer concepts presented herein may be similar in some aspects to conventional current transformer theory for instrument, relaying, and radio frequency power supply applications, except that the core used herein is not restricted to operation in the linear region. Further, for power transfer at high frequencies, it is desirable to have a low transformer leakage inductance.

The power density of core 52 is directly proportional to the frequency of the power passing through the windings 40, 60. Therefore, the use of high frequency power passing through link 50 advantageously increases the operating power density of the contactless system 30. Also, the use of high frequency currents in system 30 advantageously allows the use of small-size components to provide the required power transfer. These concepts are feasible to implement in a practical sense, and may be constructed at a potentially low cost.

A. Alternate Link Configurations

Figure 23:
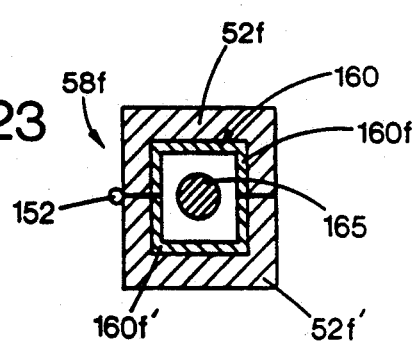
FIG. 23 is a radial sectional view of one form of an alternate split hinged coupling link of the present invention.
Figure 24:
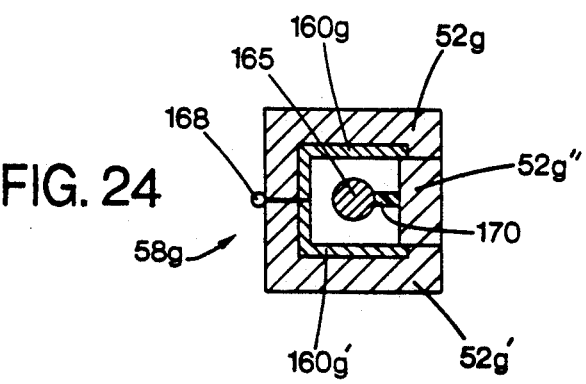
FIG. 24 is a radial sectional view of one form of an alternate split hinged coupling link of the present invention.
Figure 25:
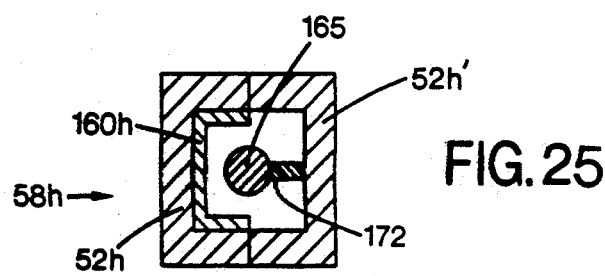
FIG. 25 is a radial sectional view of one form of another alternate split coupling link of the present invention.

Several of the cores and link members shown herein for the purposes of illustration are cylindrical members having basically circular or square cross sections. However, it is apparent that other cross sectional shapes may be used to at least partially surround conductor 40, in toroidal or cylindrical configurations, such as rectangular, elliptical or semi-circular cross sections. Several basic CWT core configurations are shown, with one being a toroidal, gapless core, as shown in FIGS. 1-4 and 6. Another basic CWT core configuration has a C-shaped core with an air gap G in the circumferential magnetic flux path of the core (see FIGS. 5, 7 and 8). Several rectangular configurations having separable cores are shown in FIGS. 23-25.

Referring to FIG. 5, an alternate link member 58b has a C-shaped core member 52b with an "air" gap G. In contrast, the gapless core 52a of FIG. 3 is captive, not easily detached from the primary cable 40, and more appropriate for a load moving in a permanently fixed path. The C-shaped core 52b may be easily removed by passing the primary cable 40 through the air gap, and is more suitable for loads requiring intermittent connection to the source. The flux path $\phi$ of FIG. 5 includes the air gap G with the flux traveling across gap G between surfaces 61 and 61' of core 52b. It is apparent that the air gap may travel any radial path or a path skewed to the radius, i.e., a chordal path or a spiral path linking the core inner and outer surfaces.

The portable clamp-on link (see FIG. 16) typically does not move continuously along the primary cable, although some lateral motion may be accommodated. Rather, the interwinding space S of the clamp-on link is only required for insulation and protection during rugged use and is preferred to be less than for a moving link. A cross sectional view of a suitable clamp-on link member 58c is shown in FIG. 6 as having two separable, mating core portions or segments 52c and 52c' joined together, for instance by a hinge 62. The separable core segments may be joined by a technique used in clamp-on ammeters, which may use a Hall effect the magnetic material surrounding a conductor to monitor the current flowing therethrough. A variety of other means may be used to secure the two core segments together, including mechanical fasteners, and the magnetic forces of attraction between the core segments when flux is flowing in the same direction through each core segment. The secondary conductor of link member 58c is also separable and split into two components, 60c and 60c' surrounded by the core halves 52c and 52c', respectively. This composite design incorporates the feature of being removable in a substantially radial direction with the feature of a gapless core, that is "gapless" to the extent there is a minimal air gap between the core segments when the link is closed.

FIG. 7 illustrates an alternate embodiment of a separable C-shaped link member 58d illustrated as having two core members 52d and 52d' joined together, such as by a hinge 64, which may be the same as hinge 62. The secondary winding of link member 58d is also split into two segments 60d and 60d'. The C-shaped core of FIG. 7 has an "air" gap G which receives a primary conductor support 80 which may be a plurality of discrete members (not shown). However, the illustrated support 80 as a longitudinal composite member having two insulative members 81 and 82 joined together by a flux conduction enhancing member, such as an I-beam shaped member 83 of a magnetic material. The magnetic member 83 is supported within the air gap by insulative member 81 which extends outwardly from a fixed surface 84 adjacent to the electric load 34'.

The flux path $\phi$ of FIG. 7 has an enhanced air gap compared to that shown in FIG. 5. The magnetic reluctance of the air gap is decreased by providing the magnetic member 83 across the air gap. The air gap magnetic reluctance is also reduced by providing a pair of enhanced surface area members 86 and 86' at the core adjacent the air gap, defining a flux path 88 therebetween, as shown in FIG. 7. The flux path 88 of core 52d, 52d' is separated by the magnetic member 83 of the composite support 80 into two components and thus would include the magnetic permeability of the member 83.

If the support 80 is one of a series of discrete supports (not shown), typically between such discrete supports the flux path 88 is comprised only of air, assuming that air is the medium in which the system is operating. The total air gap G remains the same, regardless of bouncing fluctuations of the link member 58d in directions indicated by arrow 89, which is substantially perpendicular to the radial axis X. In the embodiment of FIG. 7, the air gap G may be kept to a minimum, which advantageously reduces the total weight of the core segments 52d and 52d', and which advantageously minimizes material costs to construct the link member 58d.

Referring to FIG. 8, a link member 58e has a C-shaped core 52e which may be used with an auxiliary fixed core member 90. The fixed core member 90 may be a long planar member of a magnetic material extending along the selected path of travel of the electric load 34'. The fixed magnetic member 90 may be suspended from an insulating support member 92 extending outwardly from a fixed surface 94 to support primary conductor 40. The core 52e includes an enhanced air gap core face having segments 94 and 94' which provide flux paths 96, 96' between the core 52e and fixed magnetic core member 90. The link member 58e of FIG. 8 allows for a larger gap between faces 98 and 98' of core 52e, to allow for greater freedom of movement in the direction indicated by arrow 99, which is substantially perpendicular to the axial axis X. Thus, greater amounts of bounce may be accommodated in the direction indicated by arrow 99, particularly if the flux paths 94, 94' remain relatively constant between the moving core 52e and the fixed core member 90.

B. Coupling Link Theory of Operation

For simplicity, the analysis of the action of link 50 with respect to primary conductor 40 will be described for the gapless core of FIGS. 1-4. The design parameters for the illustrated gapless core and the movable electric load 34' are shown in Table 1.

TABLE 1

| Design Constants for Example | |
| --- | --- |
| f = 2000 Hz | |
| $f_r$ = 2500 Hz | |
| $B_m$ = 1.4 T | |
| $N_1$ = 1 | |
| $N_2$ = 1 | |
| $\rho_{wgt-core}$ = 7.32 gm/cm$^3$ (amorphous metallic glass) | |
| $\rho_{wgt-cu}$ = 8.92 gm/cm$^3$ | |
| $\rho_{cu}$ = 0.205 × 10$^{-5}$ Ω-cm | |
| $\rho_{core-loss}$ = 0.226 watts/cm$^3$ | |
| $t_{insul}$ = 1 mm | |
| $\mu_r$ = 10$^5$ (amorphous metallic glass) | |
| stacking factor = 0.75 | |
| Loads: | |
| Rating: | 100 kW each, 10 units |
| Duty cycle: | 100% |
| Frequency: | 0 (dc) |
| Voltage: | 600 |
| Path Length: | 1 km, in 5 segments |
| High Frequency Source: | |
| Rating: | 1 MW total |
| Frequency: | 2000 Hz |
| Cable Current Density: | 200 amp/cm$^2$ |
| Secondary Current Density: | 400 amp/cm$^2$ |

(1) Equivalent Circuit and Leakage Inductance

As shown in FIG. 9, the CWT equivalent circuit diagram for link 50 and primary conductor 40 is asymmetric. The equivalent circuit is oriented with the primary conductor 40 to the left, and the secondary winding 60 to the right. The leakage inductance is indicated as $L_{LEAKAGE}$, and the magnetizing inductance is indicated as $L_m$. This asymmetry is known from current-transformer theory and is due to the essentially 100% linkage of the primary current by the magnetic flux of the secondary winding 60. Any meaningful inductance on the secondary side is due to the external circuit, that is, any inductance in the secondary loop 46, the secondary converter 44, or conductors 42 therebetween.

Figure 10:
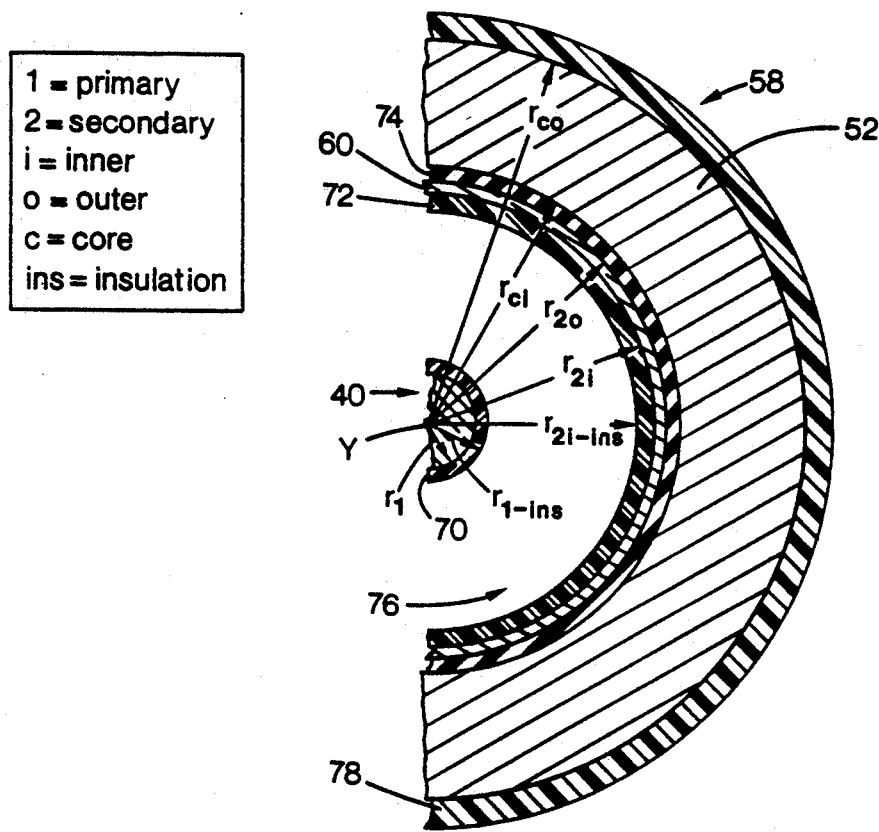
FIG. 10 is a partial radial sectional view illustrating the radial dimensions of one form of a coupling link surrounding a conductor, each of the present invention.

In FIG. 10, the link member 58 is illustrated in greater detail. The center-most conductor 40 may be an insulated conductor surrounded by an insulation layer 70. The secondary winding 60 has inner and outer insulation layers 72 and 74, respectively. The primary insulation layer 70 and the secondary winding inner insulation layer 72 define therebetween an interwinding region indicated generally at 76. The secondary winding outer insulating layer 74 separates the secondary conductor 60 from the magnetic core 52. The core 52 may be surrounded by an insulative layer 78 which is preferably of a durable plastic, or resilient rubber or other material which could be surrounded by an additional durable housing (not shown) if required to provide a rugged link 50 capable of withstanding physical abuses encountered during normal use. Preferably, the insulative layers 70 and 72 are also of a durable material, since they may be subjected to occasional frictional forces from rubbing against one another during use. Also, the center-most conductor 40 may be subjected to environmental abuses.

FIG. 10 also illustrates several radii extending from the longitudinal axis Y. The various radii have the subscripts, with the numeral 1 indicating the primary conductor 40, the numeral 2 indicating the secondary winding 60, the letter "i" indicating inner, and the letter "o" indicating outer, the letter "c" indicating the core 52, and the letters "ins" indicating the insulation layers.

The CWT has an unusually low leakage inductance which allows for a high current capacity and the use of high frequency switching converters 38 and 44 in the contactless power delivery system 30. The leakage inductance per axial meter of core length (parallel with longitudinal axis Y) may be determined in a fashion similar to that for a coaxial transmission line. For instance, when the outer conductor can be approximated by an infinitely thin current sheet:

$$L_{LEAKAGE} = [(N_1^2 \mu_o) \div (8\pi)][1 + 4\ln(K)] \text{ H/m} \quad (1)$$

$$K = (R_{2i} \div r_1) \geq 1 \quad (2)$$

where:
$N_1$ = primary turns
$r_{2i}$ = distributed secondary current sheet radius
$r_1$ = the primary cable outer radius $\mu_o$ = permeability of free space ($4\pi \times 10^{-7}$ H/m)

Figure 11:
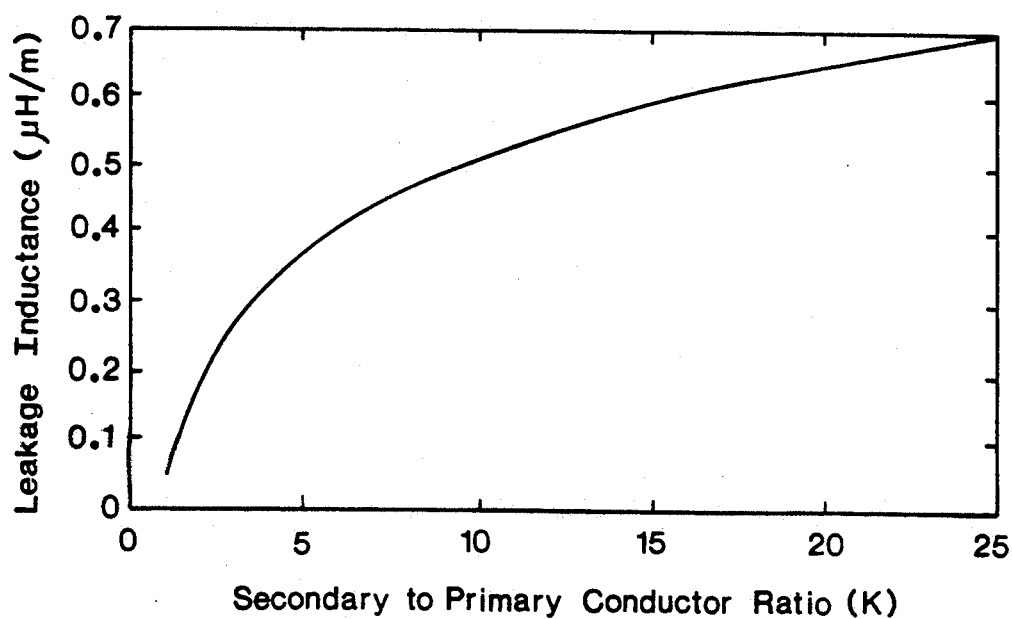
FIG. 11 is a graph of leakage inductance as a function of interwinding space for an illustrated embodiment.

The leakage inductance per axial meter for a range of values for the secondary to primary conductor ratio K is shown in the graph of FIG. 11. In a more generalized embodiment, K is the ratio of the effective radius of the core-mounted current sheet to the outer radius of the inner-most conductor. The ratio K differs from the interwinding space S as shown in FIG. 10. The ratio K relates to conductor dimensions, whereas S accounts for insulation in determining available space within the interwinding region 76. The FIG. 11 graph shows that the leakage inductance $L_{LEAKAGE}$ increases slowly with the value of K, and is less than one microhenry per meter for K≦25. Thus, the interwinding space S and interwinding region 76 for relative motion between conductor 40 and the interior of link 50 is readily provided.

Furthermore, the leakage inductance $L_{LEAKAGE}$ is insensitive to the position of primary conductor 40 with respect to the longitudinal axis Y of link member 58. This characteristic advantageously results in less stringent requirements for a position controller between, for instance, a moving vehicle supporting the link 50 and the primary conductor 40 (see FIG. 17). Thus, any relative movement, linear or rotational, between the primary and secondary windings 40, 60 has a negligible effect on the leakage inductance $L_{LEAKAGE}$ and the flux stays substantially constant.

(2) Magnetizing Inductance

The $L_m$ magnetizing inductance for a given core length $l_c$, assuming there are no air gaps G in the circumferential flux path of the core 52a, is:

$$L_m = [\mu N_1^2 (r_{co} - r_{ci}) l_c] \div [\pi(r_{co} + r_{ci})] \quad (3)$$

where:
$\mu$ = core permeability
$r_{co}$ = core outer radius
$r_{ci}$ = core inner radius
$l_c$ = axial core length As with all power delivery transformers, it is desirable to have the magnetizing inductance $L_m$ be as large as possible to minimize the magnetization current required. Thus, it is apparent that based upon the magnetizing inductance only, it would be desirable to have the core length $l_c$ be large, resulting in a long, thin core.

(3) Power Density

Figure 2:
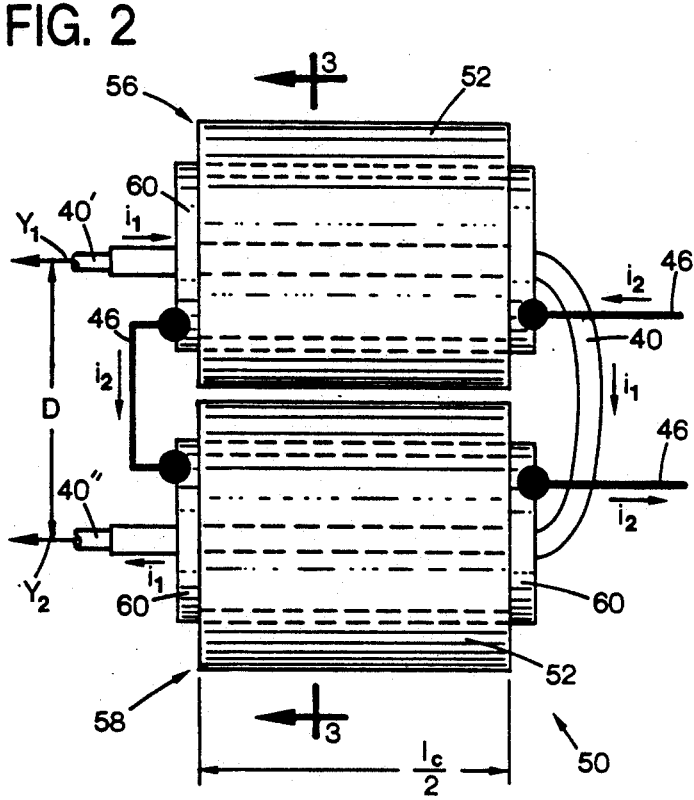
FIG. 2 is a front elevational view of one form of a dual coupling sheath or link of the present invention coupled with a conductor.

The power density per unit weight $P_{wgt}$ may be determined by expressing both power and weight in terms of the given parameters then determining the ratio therebetween. For sinusoidal root-mean-square values, unity power factor, and negligible magnetizing current $L_m$ and negligible losses, it can be shown that the power density is:

$$P_{wgt} = [2 \pi f B_m N_1 i_1 (r_{co} - r_{ci})] \div [\pi(r_{co}^2 - r_{ci}^2) \rho_{wgt\text{-}core} + (N_2 i_2 \rho_{wgt\text{-}cu})/J_2] \quad (4)$$

where:
f = frequency (Hz)
$B_m$ = peak flux density (T)
$\rho_{wgt\text{-}core}$ = core density (kg/m³)
$\rho_{wgt\text{-}cu}$ = copper density (kg/m³)
$J_2$ = secondary circuit current density The power density $P_{wgt}$ is independent of the core axial length $l_c$, since the transformer voltage, and hence the transformer power, and volume both increase linearly with the core length. However, for a specified power rating, it is apparent that the core length $l_c$ may be optimized to provide a maximum power density. This analysis results in an extremely long, thin core 52 when the primary to secondary current ratio ($i_1:i_2$) is near unity. Up to this optimum, the longest acceptable core, with a minimum core radius $r_{ci}$ may be used to achieve maximum power density, since the power density is primarily dominated by core weight. An additional operating feature that may be provided is the use of two link members 56 and 58 as shown in FIG. 2, each having a core length contributing to the total core length $l_c$, here illustrated as one half of the total core length of $l_c$ or $l_c/2$. Thus, for the design example given above, the length of the link members 56 and 58 may be on the order of 30 cm.

(4) Coupling Sheath Dimensions and Characteristic Values

The radial dimensions shown in FIG. 10 may be calculated by beginning with the innermost dimension, that is radius $r_i$ of the primary conductor 40, and then progressing in an outward direction. The equation for power density given above shows that the power density is inversely proportional to the average core radius when the core weight term is much larger than the copper weight term of the denominator. The average core radius is related to the primary and secondary ampere-turns, as well as the interwinding space S, since the core 52 surrounds both windings 40, 60, and necessarily also encloses the interwinding region 76. The optimization tradeoff for having a large interwinding space value S is that the volume of core material, and hence weight, increases with the square of the average radius of the core $r_{c(avg)}$, and the power density $P_{wgt}$ decreases.

Thus, the desired interwinding space S varies with the particular application for the contactless power delivery system 30. For continuously moving loads 34', sufficient interwinding space S may be provided so the link 50 may be positioned along the primary conductor 40 without contact. However, in practicality, some contact may occasionally occur between the primary conductor 40 and link 50. Therefore, it may be desirable to have the primary conductor insulation 70 and the secondary winding inner insulation 72 be of a low friction insulating material, such as of TEFLON ®. For a substantially stationary clamp-on link (see FIG. 16), the interwinding space S must only accommodate the insulation layers 70 and 72, without the requirement for a large interwinding region 76 as illustrated in FIG. 10. In practicality, it may be desirable to provide for a certain interwinding region 76 in the clamp-on embodiment, to accommodate multiple gauges of primary conductors 40. For the mobile unit 34', an interwinding space value K = 5 is realistic, whereas for a clamp-on unit, a realistic interwinding space value is K = 1.22, using realistic material constants as shown in Table 1 above and for a link 50 rated at 100 kW shown in Table 2 below.

TABLE 2

| Coaxial Winding Transformer Data | |
|---|---|
| kW: | 100 each (10 units) |
| phase: | 1 |
| Frequency: | 2000 |
| Primary and Secondary Voltage: | 200 |

TABLE 2-continued

Coaxial Winding Transformer Data

Primary and Secondary Current: 500

C. Primary Conductor

Figure 12:
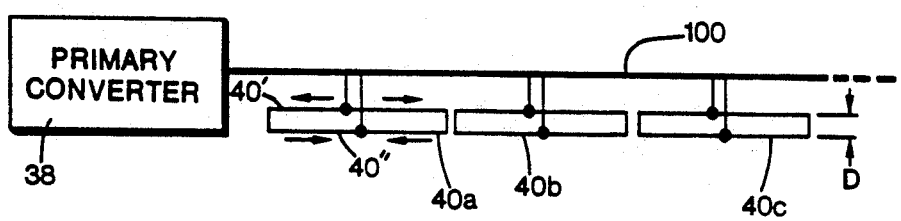
FIG. 12 is a schematic block diagram of one form of a segmented conductor portion of a power delivery system of the present invention.

The primary conductor 40 passing through each link member 56, 58 is assumed to be a single turn loop, with three such series connected loops 40a, 40b and 40c being shown in FIG. 12 for a system 30 having mobile loads 34'. Each of the series primary loops 40a, 40b and 40c receive power from conductor 100, which may be a low inductance coaxial power cable, coupled with the primary side converter 38. Using the split cores, such as of FIGS. 5, 7 or 8, or periodically opening the hinged unit of FIG. 6, a movable electric load 34' may move along a predetermined path from left to right in FIG. 12, and first receive power from primary loop 40a, then from loop 40b and finally from loop 40c and so on.

The effect of the primary cable 40 passing through the interwinding space 76 of link 50, as viewed from the high frequency source input of primary converter 38, is that there is virtually no affect experienced due to:

1. Primary cable position relative to the longitudinal axis Y of the link;
2. The position of link 50 along the primary conductor 40; and
3. The interwinding space S clearance between the primary conductor 40 and the interior of the link member.

Minimization of stray magnetic fields may require close spacing between the sending and receiving portions 40' and 40" of for example loop 40a. This feature of locating the sending and return paths 40 and 40' in relative close proximity makes the dual link 50 having link members 56 and 58 (see FIGS. 1-4) an attractive embodiment for reducing overall core lengths. A dual link may also be a more rugged and durable link 50.

The inductance of each primary cable loop 40a, 40b and 40c, is considered to be in series with the leakage inductances $L_{LEAKAGE}$ of link 50, and is given as:

$$L_{loop} = [(\mu_o \div 2\pi)][\ln(D+r_1)] \text{ per meter} \quad (5)$$

where D is the center-to-center lateral spacing of the sending and return path cables 40' and 40".

This equation shows the insensitivity to the inductance of the link 50 to the size or gauge of conductor 40 and to the spacing D between the sending and return loop portions 40' and 40". This equation also shows the linear dependence of the inductance of each loop $L_{loop}$ on length. The loop spacing D may be fixed by the dimensions of the cores of link members 56 and 58, with $2 r_{co}$ being the minimum possible for a centered primary cable axis (not shown) extending between the link members 56 and 58.

The loop segment input impedance $Z_{in}$ for each loop 40a, 40b and 40c is given by:

$$Z_{in} = (R_{pri} + R_{load(equiv)}) + j2\pi f(L_{loop} + L_1) \quad (6)$$

where each load unit $R_{load(equiv)}$ is the equivalent resistance at rated output referred to the primary side of the CWT.

When the reactive term on the right of the input impedance equation is much larger than the resistive term to the left, the loop input impedance $Z_{in}$ varies linearly with the loop length and frequency, but only logarithmically with the spacing. This characteristic of the loop input impedance suggests segmenting the primary conductor 40 into several small loops, such as 40a, 40b and 40c of FIG. 12, to reduce the loop length and required input voltage. In the design example of Tables 1 and 2, the loop input voltage for one large segment is over 7 kV, whereas the loop input voltage for 5 segments is only 4.1 kV.

In the illustrated embodiment, the resistance of the primary cable 40 dominates the power loss of the entire contactless power delivery system 30, as is the case in other power distribution and power transmission systems. For a given current density $J_1$, primary current $i_1$ and total length per segment $l_{loop}$, the resistance and power loss are given as:

$$R_{pri} = ([\rho_{cu} J_1] \div [i_1])(L_{loop}) \quad (7)$$

$$P_{loss} = \rho_{cu} J_1 i_1 l_{loop} \quad (8)$$

The design example calculations discussed herein are based on five 200 meter loop segments, three of which are shown as 40a, 40b, and 40c, with a total of 400 meters of primary cable length in each loop. The sample calculations also assume a dual link 50 having two link members 56 and 58 as shown in FIGS. 1-4. The parameters for the primary loop are given in Table 3 below, assuming each of the five loop segments has two 100 kW loads traveling thereon, which appear in series.

TABLE 3

Primary Loop Segment Data

| Parameter | Mobile | Clamp-on |
|---|---|---|
| D (cm) | 12.998 | 6.512 |
| $L_{loop}$ (mH) | 0.22 | 0.16 |
| $R_{rpi}$ (ohm) | 0.033 | 0.033 |
| $P_{loss}$ (kW) | 8.2 | 8.2 |
| $R_{load(equiv.)}$ (ohm) | 0.4/load unit | 0.4/load unit |
| $Z_{in}$ (ohm) | 0.833 + j2.76 | 0.833 + j2.07 |
| $V_{in}$ (rms volts) | 1441 | 1117 |
| $I_{loop}$ (rms, amperes) | 500 | 500 |
| $P_{in-max}$ (kW) | 200 | 200 |

D. Primary Side Power Electronics

Figure 13:
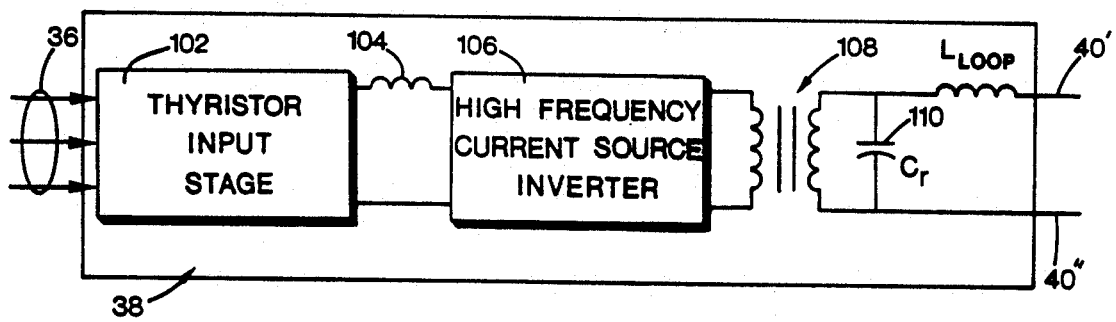
FIG. 13 is a schematic block diagram of one form of a primary side converter of the present invention.

The approach described herein uses power electronics to optimize system performance and to meet currently realized practical design considerations. In the illustrated embodiment, starting from an AC or DC source, here illustrated as a conventional three-phase 60 Hz AC source 32, a high frequency current on the order of 2 kHz is needed for the primary loop 40. At power levels of commercial interest, such as greater than one megawatt (1 MW), one cost effective approach involves using an input stage, such as a thyristor rectifier 102 as shown in FIG. 13. The rectifier 102 provides a DC output received by a choke coil 104 to provide a DC current source for a high frequency current source inverter (CSI) 106. The current source inverter 106 has a plurality of switches which are controlled to provide a desired high frequency output to an optional impedance matching transformer 108. If utility side power factor and harmonic interactions are a concern, harmonic filters (not shown) may be used for reactive and harmonic compensation, as is an industry wide standard practice. Alternatively, more advanced GTO-based (gate turnoff thyristor) force commutated input rectifiers, also known in the industry, may be used.

In the illustrated embodiment, two considerations are used to govern the choice of converter topology for the high frequency current source inverter 106 to provide the desired high frequency operation.

First, at the high operating frequency, the impedance of the primary conductor 40 is dominantly inductive. As seen in Table 3 above, the inductive impedance for a 200 meter segment of primary cable is 2-3 ohms, as opposed to a resistive component of 0.033 ohms, which clearly indicates that the primary conductor is highly reactive. Consequently, operating the contactless power delivery system 30 at 500 amperes, which corresponds to 200 kW, suggests the inductive component required to energize the cable is 700 kVAR. For the entire illustrated system, with a one megawatt rating (1 MW), this corresponds to an inverter rating of 3.5 MVA.

Overrating of the inverter may be avoided using a resonant inverter topology as is known in the art, for example, as described in an article by F.C. Schwarz and J.B. Klaassens entitled "Controllable 45 kW Current Source for DC Machines," IEEE Transactions IA, Vol. IA-15, No. 4, July/August, 1979, pp. 437-444. The inductance of the primary conductor 40 may be compensated using a parallel resonant capacitor 110 having a capacitance $C_r$ connected across the output of inverter 106. The volt ampere reactive (VAR) requirements of the primary cable 40 may then be supplied by the resonant capacitor 110, and the inverter 106 then need only supply the real power (watts) needed by the system. A preferred topology for the inverter 106 is a current fed series output parallel resonant (SOPR) inverter, such as that extensively used in induction heating applications at similar frequencies.

The second concern governing the choice of converter topology is that inverters switching at high frequencies are normally limited by the switching losses occurred within the devices. The use of resonant topologies allows device switching near zero voltage or zero current crossing points, which results in significantly lower switching losses and the ability to obtain higher frequencies.

The primary side converter output requirements for the illustrated example are listed in Table 4 below.

TABLE 4

| Primary Side Converter Data | | |
|---|---|---|
| Parameter | Mobile | Clamp-on |
| MW | 1.0 | 1.0 |
| voltage (v) | 1441 | 1117 |
| current (a) | 694 | 895 |
| frequency (Hz) | 2000 | 2000 |
| phase | 1 | 1 |
| K | 5 | 1.22 |

The required capacitance $C_r$ for the resonant capacitor 110 to provide operation at a resonant frequency $f_r$ is:

$$C_r = (4\pi^2 f_r^2 n_l L_{loop})^{-1} \quad (9)$$

where $n_l$ is the number of loop segments, e.g., five in the illustrated embodiment, when the inductances of link 50 are relatively small and negligible when compared to the inductance of primary loop 40. Thus, in the illustrated design example, values for the resonant capacitor 110 are given in Table 5 below.

TABLE 5

| Resonant Capacitor Data | | |
|---|---|---|
| Parameter | Mobile | Clamp-on |
| $C_r (\mu F)$ | 3.7 | 25.3 |
| Voltage (Vac) | 1441 | 1117 |
| Current | 500 | 500 |

E. Secondary Side Power Electronics

Figure 14:
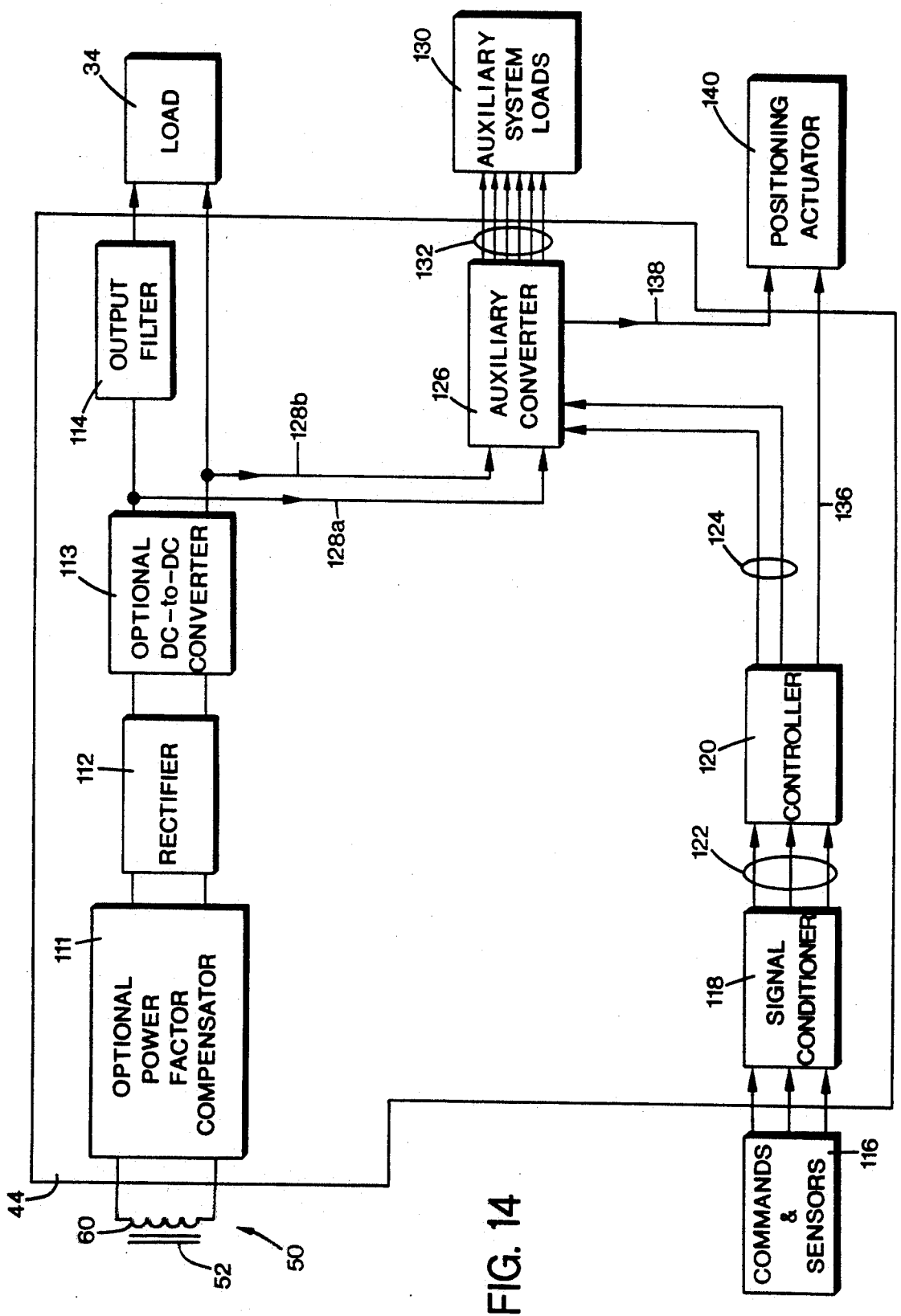
FIG. 14 is a schematic block diagram of one form of a secondary side converter of the present invention.

The secondary side converter 44 may be either one converter for each link member 56, 58 or two discrete converters, but for simplicity is shown in FIG. 14 for the mobile embodiment as a single converter 44. The converter 44 converts the high frequency power received by link 50 into a desired AC frequency or DC power as dictated by the needs of the load 34. The link 50 is shown schematically in FIG. 14 as a core 52 and secondary winding 60. As shown in FIG. 14, the secondary converter 44 has an optional power factor compensator, such as a power factor compensation circuit 111, and a rectifier, such as a full wave bridge rectifier 112 which may include an optional compensating filter (not shown), which are each well known in the art.

The optional power factor correction circuit 111 may include a capacitor circuit, such as a variable capacitor, coupled with the secondary winding 60. The power factor compensator 111 may be a simple capacitor or a power electronic circuit arranged to provide the desired power factor compensation. In some applications, it may be preferred to have the secondary side of the system appear as merely a resistive load when viewed from the primary side, particularly from the AC source 32. This may be accomplished by adjusting the power factor compensator 111 to provide unity power factor, such as may be provided by a static VAR compensator (SVC).

The secondary converter 44 may also include an optional DC-to-DC converter, such as a DC to DC chopper 113, coupled across the DC output of rectifier 112. The chopper 113 may be a simple transistor switch having collector and emitter coupled across the output of rectifier 112. The chopper 113 matches the DC voltage from rectifier 112 to that required by the load 34.

In this embodiment, using a full wave bridge rectifier 112 provides a DC output which is fed through an output filter 114 and delivered to the load 34. The output filter 114 may make the secondary converter 44 appear to the load 34 as a current source. In some applications, the output filter 114 may be omitted and replaced by a capacitor (not shown) in parallel with the rectifier output, so the secondary converter 44 would appear to load 34 as a voltage source.

The secondary side converter 44 may also provide other outputs and functions, such as receiving inputs from other sensors and operator input commands 116 located on-board the load, such as for an electric vehicle. These sensor signals and commands are received by a signal conditioning unit 118. A controller 120 receives conditioned signals 122 from the signal conditioner 118 and operates to provide a control signal 124 to an auxiliary converter 126. The auxiliary converter 126 taps a portion of the DC power converted by rectifier 112 via conductors 128a and 128b and converts this power according to the control signal 124 to provide power to a variety of auxiliary system loads 130 via conductors 132.

Additionally it is within the level of skill in the art to provide the secondary side converter 44 with various means to provide voltage boosts, frequency changes, phase changes, and inner loop control. As a further alternative embodiment, the secondary converter 44 may be similar to the primary converter of FIG. 13 to provide an AC output to load 34. Furthermore, the secondary side converter may also be modified (not shown) to provide two or more of these various outputs to load 34. If the power delivered or transferred by link 50 is at suitable voltage, current, phase and frequency levels, the secondary side converter 44 may be eliminated.

Figure 15:
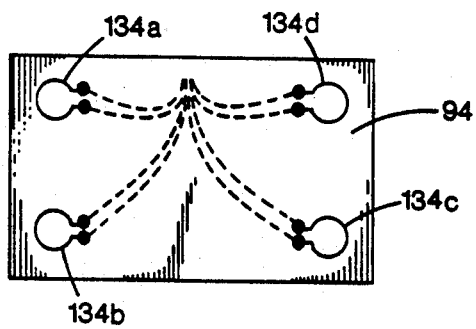
FIG. 15 is a side elevational view taken along line 15—15 of FIG. 8.

For a movable electric load 34' (see FIG. 17), the output of link 50 may be optimized by maintaining the position of conductor 40 to be substantially colinear with the longitudinal axis Y of link 50. For example, the enhanced C-shaped cores of FIGS. 7 and 8 may have flux sensors mounted in the air gap faces 86, 86' and 94, 94' FIG. 15 shows one manner of flush mounting four flux sensors 134a, 134b, 134c and 134d on surface 94 adjacent each corner. The flux sensors 134a–134d, such as simple $\frac{1}{2}$" diameter loops of wire or Hall effect sensors, are inlaid substantially flush into the core material and bonded, such as by epoxy, in place. The Hall effect sensors are preferred for normal operating temperatures, and the wire loop sensors are preferred for high-temperature applications due to the sensitivity of the Hall effect sensors at high temperature.

The output from the flux sensors 134a–134d is an input to the sensor block 116 of FIG. 14. The flux sensor signal is conditioned by signal conditioner 118 and received controller 120. The controller processes the flux sensor signals from each of the core faces 94 and 94' or 86 and 86', and determines therefrom a positioning control signal 136. Positioning power 138 from auxiliary converter 126 and the positioning control signal 136 are provided to a positioning actuator (not shown).

F. Secondary Conductor

The secondary conductor 46 includes the generally tubular secondary winding 60 in the preferred embodiment located to the interior of core 52, and the balance of the secondary loop conductors, labeled generally as 46, required to delivery power from the secondary winding 60 to load 34. The effective inductance which increases linearly with the length of the secondary conductor 46 determines the relative importance of the proximity of the load 34 to link 50. Conceivably, the load 34 could be coupled directly with the secondary winding 60 and mounted adjacent to the core outer insulating layer 78, resulting in minimal secondary circuit inductance. In the illustrated embodiment, with the primary loop 40 operated in resonance based on the inductance of loop 40, including the load inductance, the secondary conductor inductance is desirably kept at a constant value, so as not to affect the resonant frequency $f_r$ of the power delivery system 30. Fortunately, this scheme is readily implemented and easily accomplishes the design goals of minimizing trailing cables and mobile hardware.

G. System-Based Design

The nature of the system-based design described herein is provided from a consideration of the various tradeoffs in the context of the overall performance of the contactless power delivery system 30. This section discusses those characteristics which are unique to the use of the link 50 with primary conductor 40, and which tend to impact the design of the overall system 30.

(1) Maintainability and Reliability

The contactless power delivery system 30 described herein advantageously has a forgiving nature with respect to the position of primary conductor 40. This feature greatly reduces the design demands on the system 30 in several ways, including, a reduction in physical stress of the primary cable, more lax performance requirements of the core position guide actuator and increased insensitivity to abnormal conditions, discussed further below. Since the system performance is relatively insensitive to the position of primary conductor 40 within the interwinding region 76, maintaining an exact position and tension of the primary conductor 40 is not required. Furthermore, exposed live conductors, as proposed in earlier systems, may be completely eliminated herein through the use of insulated cables.

(2) Economic Issues

The maintenance costs of the contactless power delivery system 30 may be much lower than the conventional metal-to-metal contact systems. The hardware of system 30 and the capital costs for installing the land-based system are much lower than the costs associated with the previous contactless conduction systems such as the flat coil inductively coupled systems having a portion of the stationary core buried in the roadway (described in the background portion above). For the illustrated mobile contactless system 30, all of the core and secondary circuit portion is mobile, and only the primary conductor 40 remains stationary.

For example, the mobile core 52 uses the entire core during operation, whereas in contrast, the stationary buried core of the prior systems uses only a tiny fraction of the total core at any given time. The greatly reduced amount of core material used in system 30 renders it a far more economic system, particularly for electrical vehicle use. The losses in the primary loop increase with current density and conductor current, so higher efficiency units require either more conductor material or more core material, as seen in Equations 7–8.

Since the overall system losses increase with the current density and conductor current, a higher efficiency link 50 may require more conductor material or more core material. For example, in the cores having an air gap, larger secondary windings are required than for a gapless core unit.

As a further advantage of system 30, the controlled thyristor input of the primary converter 38 provides the capability for full regenerative energy recovery. For example, since the CWT may transfer power in either direction, regenerative energy recovery may be useful in elevators or tracked vehicles, such as trains, when traveling downhill or decelerating, where there is a surplus of energy which may be converted and delivered back to the source (see FIGS. 18 and 19).

(3) Abnormal Conditions

The contactless power delivery system 30 may be designed to withstand electrical faults and physical damage, including the ability to ride through minor system disturbances, and safely detect and protect the system from major problems. For example, in the event of a severe electrical fault in the high frequency system, a one-half cycle fault clearance time is much faster than at conventional frequencies, e.g., $\frac{1}{2}$ cycle is 250 microseconds for an operating frequency of 2,000 Hz, which is compared to 8 milliseconds for 60 Hz.

An open circuit situation in the secondary conductor 46 forces the core 52 into extreme saturation and overheating, similar to conventional current transformers. Open circuit detection and protection may be provided by monitoring for over-voltage conditions, and upon detection thereof, switching in a fail-safe shunt circuit (not shown) to limit the secondary voltage to acceptable levels. An optional transformer (not shown) may be located between the AC source 32 and the primary converter 38 to provide electrical isolation of the primary loop 40 from the utility grid. Also, such an optional transformer may be used for voltage change to allow operation of the primary side converter 38 at optimal levels. Also optional transformers may be used on only the secondary or on both sides to operate each converter at desired values.

Abnormal conditions encountered by the system 30 also include various environmental and physical problems to which link 50 and conductor 40 may be subjected. The design of the link 50 and primary conductor 40 described herein has the following characteristics which enable the system to withstand such physical abuse:

(1) Insensitivity to location within the interwinding space 76 allows for as much physical protection material (not shown) as required;

(2) The relative motion and the large interwinding space 76 promote efficient heat removal from the link 50; and (3) The optional secondary converter 44 may be mounted in a suitable enclosure on a mobile load 34', and can be designed to be immune to heat, shock, and moisture as required for the particular application.

H. Potential Applications

Referring now to FIGS. 16–19, several applications are shown which may be useful in underwater material handling, elevators, power distribution and recharge applications for autonomous electric submarines, vehicles and other submerged equipment, such as for oceanographic exploration and mining applications. Other applications include charging on-board batteries, for instance, when a vehicle is parked at rest during breaks or loading time for moving equipment.

Referring to FIG. 16, the contactless power delivery system 30 is configured as a power distribution system having a contactless clamp-on link 150, shown with components similar to that described for link 50 and further including the following features. The link 150 is separable for example by translational or pivotal motion, or other opening action. For example, link 150 in FIG. 16 has a hinge 142 with a spring closure member 144 used to urge or bias the clamp-on embodiment into a closed position. A release latch mechanism 146 and handle 148 may be included for easy coupling and decoupling of the clamp-on link with primary conductor 40.

In a typical land-based design, for a 100 kW load, the link 50 weighs approximately 14 kilograms. To "plug-in" a power tool with a rating of one kilowatt (1 kW) into the 500 Amp primary loop of the above example, requires a clamp-on link 150 having a weight of less than 0.2 kilograms. Furthermore, the clamp-on link 150 may be engaged with conductor 40 without exposing a user to live conductors, and without any sparks which may ignite hazardous material. The clamp-on link 150 may advantageously be used in lieu of conventional power center couplers. Furthermore, with an overhead suspended mounting for the primary conductor 40, trailing cables to the portable loads such as 34", are minimized to reduce hazards to operating personnel.

A further advantage of using current source characteristics as described herein for feeding the primary cable 40 allows the use of series-connected loads 34, which may be coupled or uncoupled from the primary conductor 40 as required. This diverges significantly from conventional power distribution systems where multiple loads are typically connected in parallel. Using system 30, the load 34 may be clamped on at any location along the primary conductor 40, which advantageously provides a flexible power distribution system for use underwater. Furthermore, since no live contacts are exposed, electrical arcing during coupling is eliminated.

Figure 17:
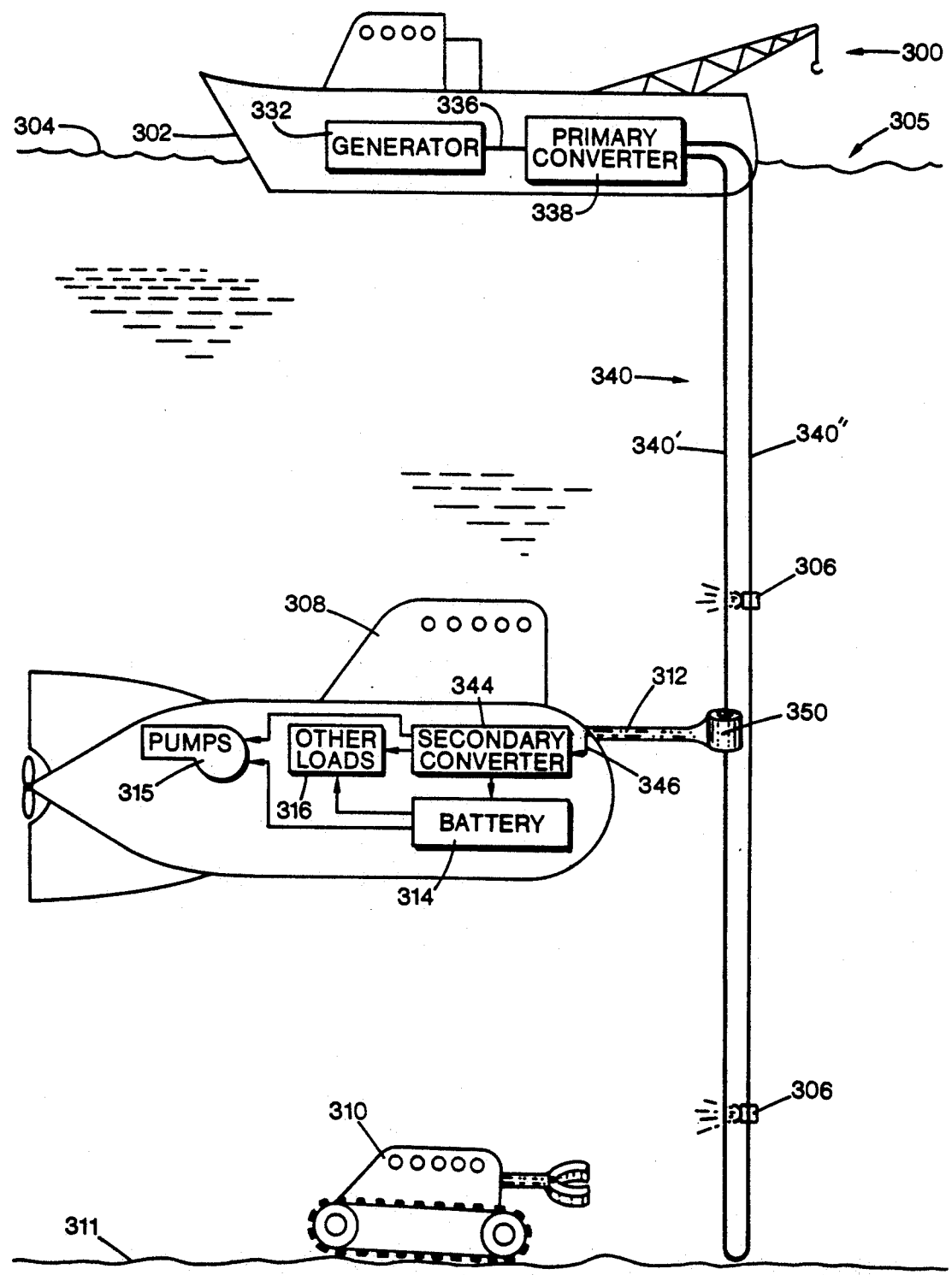
FIG. 17 is unscaled schematic side elevational view of one form of an underwater or submersible contactless power delivery system of the present invention.

Referring to FIG. 17, one embodiment of an underwater contactless power delivery system 300 constructed in accordance with the present invention is illustrated for marine exploration. Several of the components for the underwater system 300 may be substantially the same as described above for the land-based system 30, and these components have been assigned item numbers increased by 300 over their land-based counterparts. The system 300 may include a surface power source, such as a generator 332 on board an oil drilling rig (not shown), or a boat 302 floating on a surface 304 of a sea or ocean 305. The generator 332 may be coupled to a fossil-fuel burning prime mover, such as an internal combustion engine or a gas turbine (not shown); however, it is apparent that other sources of energy, such as solar or wind, may also be used.

Via conductor(s) 336, the generator 332 may supply power to an optional on-board primary converter 338. A primary conductor or cable 340 extends from the output of converter 338 downwardly into the ocean 305. The primary conductor 340 is illustrated as a loop configuration, having sending and return conductor portions 340' and 340", respectively.

One or more lights 306 may be coupled to and powered by the conductor 340, for instance, conductor portion 340'. For underwater vehicles, such as a submarine 308 or a tracked vehicle 310 traveling on the ocean floor 311, the lights 306 aid these vehicles in locating the primary conductor 340 for recharging.

The submarine 308 may be equipped with a retractable arm 312 which terminates in a CWT pod comprising a coupling sheath or link 350. The link 350 may be substantially as described above for links 50 or 150, and may be dual link as illustrated in FIGS. 1–4, or a single link as shown in FIG. 17. However, the submersible link 350 preferably has core-mounted secondary conductors encased or encapsulated in a shell, such as shell 416 in FIG. 21, of a conformable, waterproof, electrically insulative material, such as a plastic, resin, teflon, rubber or other elastomeric material, or their structural equivalents as known to those skilled in the art. The submarine 308 may have an optional secondary-side converter 344 which receives power via a conductor 346 from the link 350.

The secondary converter 344 may supply power to a battery storage system 314, ballast pumps 315, or other loads 316, such as power and control systems for running the life-support and navigational systems of submarine 308. A variety of structurally equivalent configurations known to those skilled in the art exist for powering such systems. For example, power may be supplied directly from the battery 314 to the pumps 315 and other loads 316 as shown, or by using the battery 314 as an input (not shown) to the secondary converter 344 which then supplies power to the pumps and other loads.

The tracked vehicle 310 may be equipped in a similar fashion with an on-board secondary converter, battery storage system, pumps and other loads (not shown) as described for the submarine 308. The vehicle 310 may return periodically to the primary conductor 340 for charging, and after recharging, continue with exploration or other duties on the ocean floor 311.

Thus, the converter system 300 may be used to distribute power to a variety of different types of submerged loads. Other applications for underwater system 300 include extending the underwater operating range of conventional submarines, delivering power to underwater mining machines, and powering equipment around deep sea oil platforms.

Using a dual primary conductor 340, is believed to be particularly advantageous for several reasons. For example, the return conductor 340" may be used for powering a continuous flow of vehicles upward or downward along cable 340". While vehicles are ascending or descending along cable 340", simultaneously vehicles which are already submerged may recharge by coupling their links 350 to the other cable 340'.

Another significant advantage of the underwater system 300 is its reliability. If the primary conductor 340 were to break, power delivery to the submerged vehicles 308, 310 could continue, albeit at reduced levels. A return current path for power delivered from the primary converter 338 through conductor 340 is provided by using the sea water of ocean 305, since water is a conductor. Under emergency conditions, on-board batteries can be recharged, and both equipment and personnel can be safely retrieved using the underwater system 300.

An additional significant feature of the underwater contactless power delivery system 300, is the ability to transfer control and communication information through the primary conductor 340 between the underwater vehicles 308, 310 and the boat 302. Other advantages of the submersible contactless power delivery system 300 include: contactless power transfer which eliminates the need for exposed electrical contacts; the ease with which the link 50 is connected and disconnected from the primary conductor 340, allowing manual or mechanized coupling; the capability for high power operation (from a few kilowatts to well into the megawatt range); high power density from the use of high frequency AC power and convective cooling provided by the liquid surrounding the coupling link 350; single or dual primary conductors 340; continued operation even after breakage of the primary conductor 340; force neutral operation; and the ability to superimpose control and communication signals over the AC power waveform flowing through conductor 340.

Figures 18, 19:
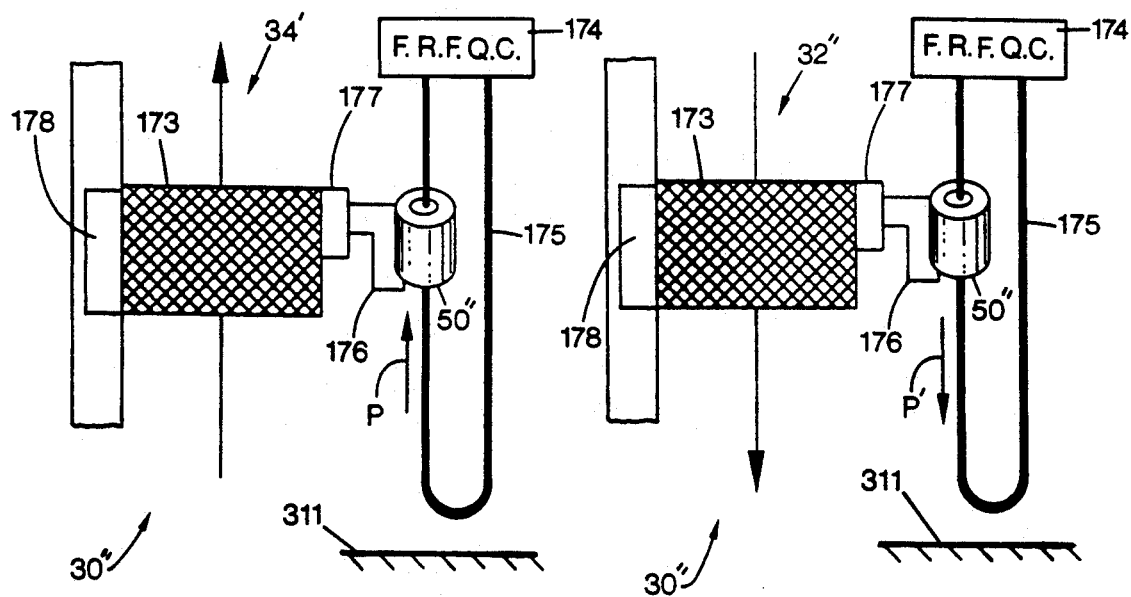
FIG. 18 is a combined schematic and perspective view of one form of another alternate contactless power delivery system of the present invention.
FIG. 19 is a combined schematic and perspective view of the contactless power delivery system of FIG. 18.

FIGS. 18 and 19 illustrate an alternate embodiment of a contactless power delivery system 30" having the capability for full regenerative energy recovery, since the CWT may transfer power in either direction. The system 30" is illustrated using an elevator 173 which may be either land-based, or submerged, such as for use with oil-drilling platforms.

In FIG. 18, the elevator 173 is receiving power, as indicated by arrow P, from a fully regenerative four quadrant converter (labeled as "F.R.F.Q.C.") 174 through conductor 175 which functions as a primary winding. The link 50" is slidably coupled to the conductor 175 to transfer power via a conductor 176 between the primary conductor 175 and a second converter 177. The converter delivers the required power to a linear motor 178 which then raises the elevator 173 according to the elevator input commands (not shown). Thus, the linear motor 178 serves as the load 34' as elevator 173 travels upwardly.

In FIG. 19, when the elevator 173 travels downwardly assisted by the force of gravity, the linear motor 178 generates surplus power. This surplus power is delivered to converter 177, which then functions as a primary converter. Power is delivered from converter 177 to link 50" via conductors 176. The link 50" transfers energy as indicated by arrow P' to conductor 175, which now functions as a secondary conductor, for delivery to the "F.R.F.Q.C." 174, functioning now as a secondary converter. Thus, the linear motor178 of FIG. 19 serves as a mobile generator power source 32". Other land-based examples of regenerative energy recovery systems include tracked vehicle systems, such as trains, when traveling downhill or decelerating, where there is a surplus of energy which may be converted and delivered back to the engine.

Rather than an elevator running on a track, the principles of system 30" may be extended to ascent and descent of the submarine 308 and tracked vehicle 310 of the submerged system 300. On board the boat 302, the regenerative converter 174 may be substituted for the primary converter 338, and the submerged conductor 340 may serve as the conductor 175. The converter 344 on board the submarine 308 or the tracked vehicle 310 may serve as converter 177 to power ballast pumps 315, rather than motor 178 for ascent. During descent, if the pumps 315 were allowed to function as turbines to serve as a prime mover for an electric machine, power may be generated. The power generated on board during descent may be used to charge the battery 314, or be delivered via link 350 and conductor 340 to the converter 338 on boat 302.

I. Prototype Operation

Laboratory prototypes were constructed and tested for both the land-based or space-based system 30 and the underwater system 300.

(1) Land-Based System Prototype

A laboratory prototype was constructed of the contactless power delivery system 30. A 2,000 Hz sinusoidal primary current provided 138 ampere-turns which were circulated in a primary loop 40 through a link 50 having dimensions as shown in Table 6.

TABLE 6

| Test Coaxial Winding Transformer Data | |
|---|---|
| K (cm) | 20.2 |
| length (cm) | 2.54 |
| height (cm) | 8.89 |
| width (cm) | 8.89 |
| Wgt (kg) | 0.557 |
| Vol (cm$^3$) | 92.5 |

Figure 20:
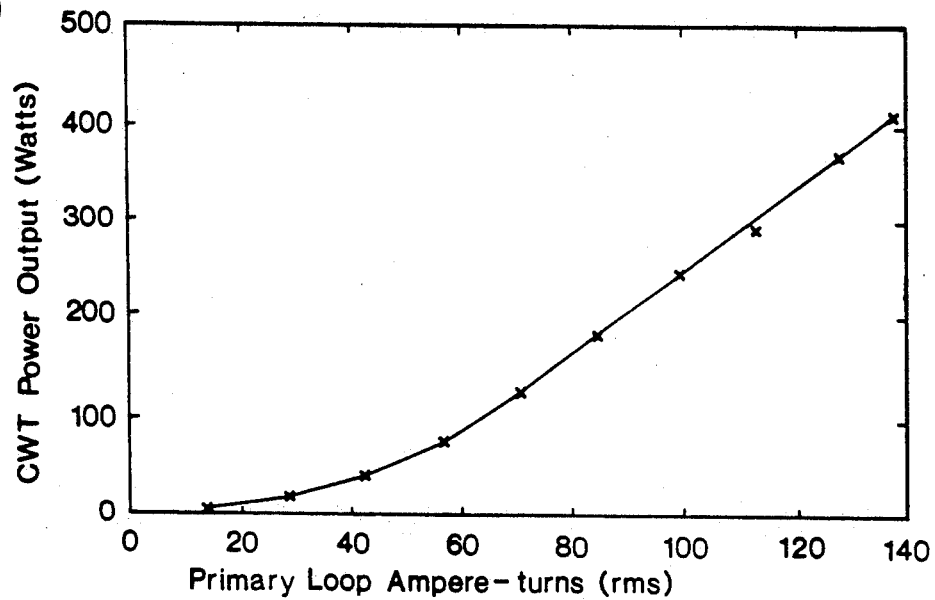
FIG. 20 is a graph of power transfer through a land-based prototype unit constructed in accordance with the present invention.

The link 50 included a single toroidal core 52a constructed from 1 mil (0.001 inches) thick amorphous metallic glass tape encircling a copper tubular secondary winding 60 having a primary cable 40 inserted therethrough. The graph of FIG. 20 shows the data collected while increasing the primary loop current i₁ when the load resistance is at a fixed value. As expected, the power output initially increases quadratically with the current, then less than quadratically as the core material saturates. The output power test was limited by the laboratory power supply, with the core 52 at saturation voltage, but with much less than the maximum current capacity flowing therethrough. The data shows successful delivery of significant power to the secondary winding 60 using the link 50 as described.

Table 7 compares the theoretical expected values to the measured results for the power densities for the link dimensions and primary ampere turns actually used in the test.

TABLE 7

| Parameter | Laboratory Data | |
|---|---|---|
| | Theoretical | Measured |
| $P_{wgt-dens}$ (kW/kg) | 0.80 | 0.75 |
| $P_{vol-dens}$ (W/cm³) | 5.9 | 5.6 |

Both of these parameters and the measured values correlate well with the theoretical values. Higher power levels may be achieved by increasing the core cross section to handle more voltage or by increasing the primary loop current, with a proportional decrease in the load impedance. The values are significantly lower than the design example, since high values of current were not achieved at 2,000 Hz with the available laboratory equipment. Since coaxial winding transformers generally have been tested at 50 kW in a 50 kHz system by two of the coinventors of the present invention, upscaling of the prototype unit tested is believed feasible (see the article by M. H. Kheraluwala, D. W. Novotny, D. M. Divan, "Design Considerations for High Frequency Transformers," IEEE-PESC-90 Record, pp. 734-742.

(2) Underwater System Prototype

Figure 21:
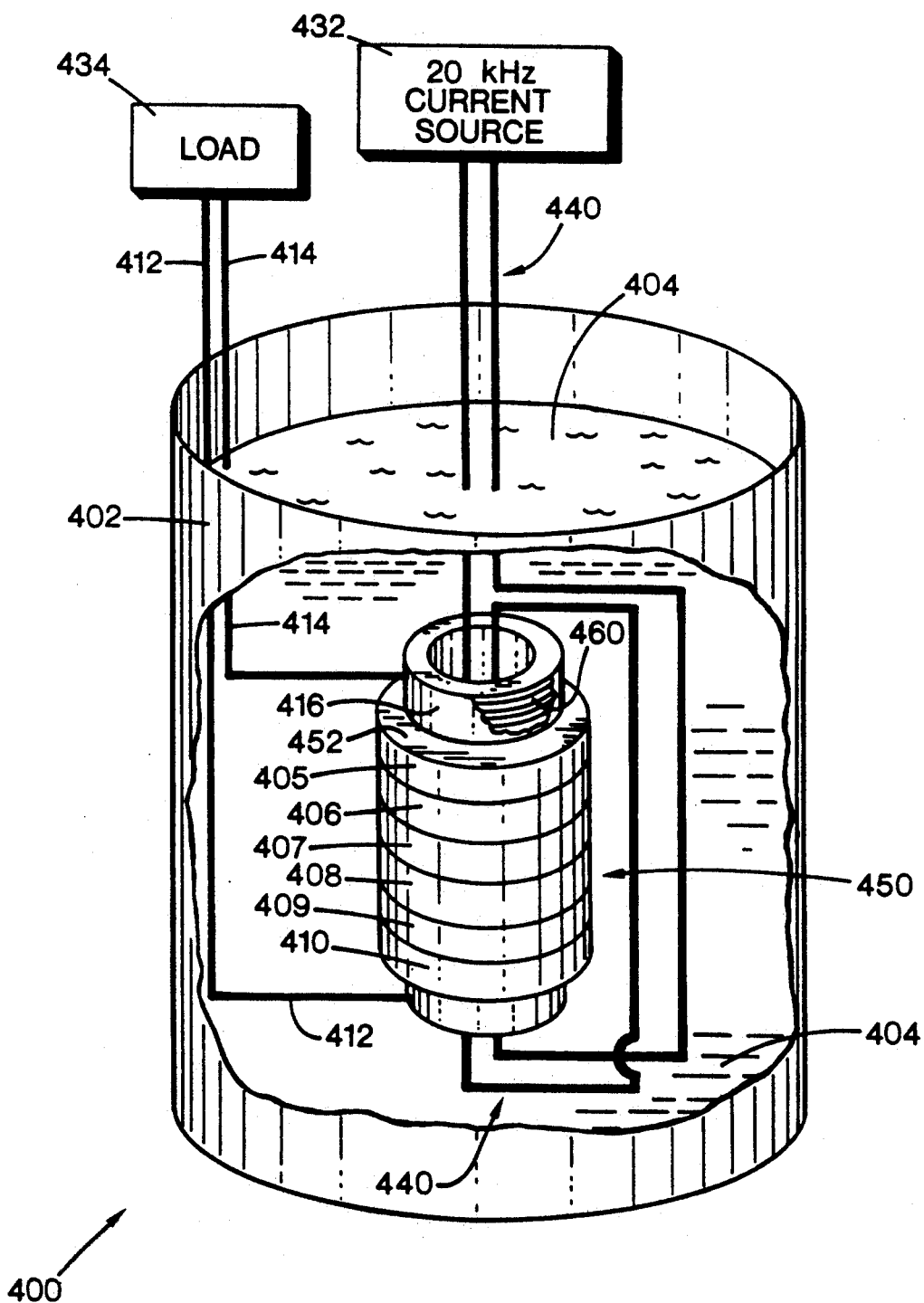
FIG. 21 is a schematic partial cutaway perspective view of one form of a prototype submersible contactless power delivery system of the present invention.

FIG. 21 illustrates a laboratory prototype submersible contactless power delivery system 400. The prototype system 400 included a tank 402 which was initially filled with distilled water and salt was gradually added to form a saline solution 404 having a concentration of 30 grams of salt per liter of water. This final concentration level was chosen because it is substantially equivalent to the salinity of most sea water. Several of the components for the prototype system 400 correspond to the submersible system 300 and the land-based system 30, and these components have been assigned item numbers increased by 400 over their land-based counterparts.

For the primary power source a variable high frequency current source 432 was used having a range of 5-40 kHz. a coupling link 450 having a core-mounted secondary conductor 460 and a core 452 was submersed in the tank 402. The core 452 was constructed of six stacked annular ferrite core sections 405, 406, 407, 408, 409 and 410, each of a standard PC-30 type ferrite core material. The current source 432 of system 400 was coupled to a primary conductor 440, which was submersed in the tank 402. The primary conductor 440 was looped twice through the secondary conductor 460 of link 450. A pair of a load conductors 412 and 414 coupled the conductor 460 to a load 434.

The prototype system 400 was tested under laboratory conditions with a current of 2.8 Amps-rms (rrot- mean-square) supplied by the current source 432 to flow through the primary conductor 440. AT this current level, with the conductor 440 looped twice through the link 450, the system 400 was tested at 5.6 ampere-turns. The prototype system 400 had maximum power capability of approximately one kilowatt at a frequency of 20kHz.

The prototype system 400 was first operated at a frequency of 20 kHz and losses were periodically warned as the salinity of solution 404 was increased from zero to 30 grams/liter. The losses measured were the open-circuit power losses comprising the core loss and losses through the salinated waters surrounding the coupling link 450. Initially, the core-mounted conductor 406 was not electrically insulated from the surrounding salt water, and the losses were high. For example, referring to the open-circuit power losses graph of FIG. 22, at full sea water concentration and without insulation of conductor 406 at 20 kHz, the losses were greater than 140 watts, as indicated by the data point marked with an "X" in FIG. 22.

Figure 22:
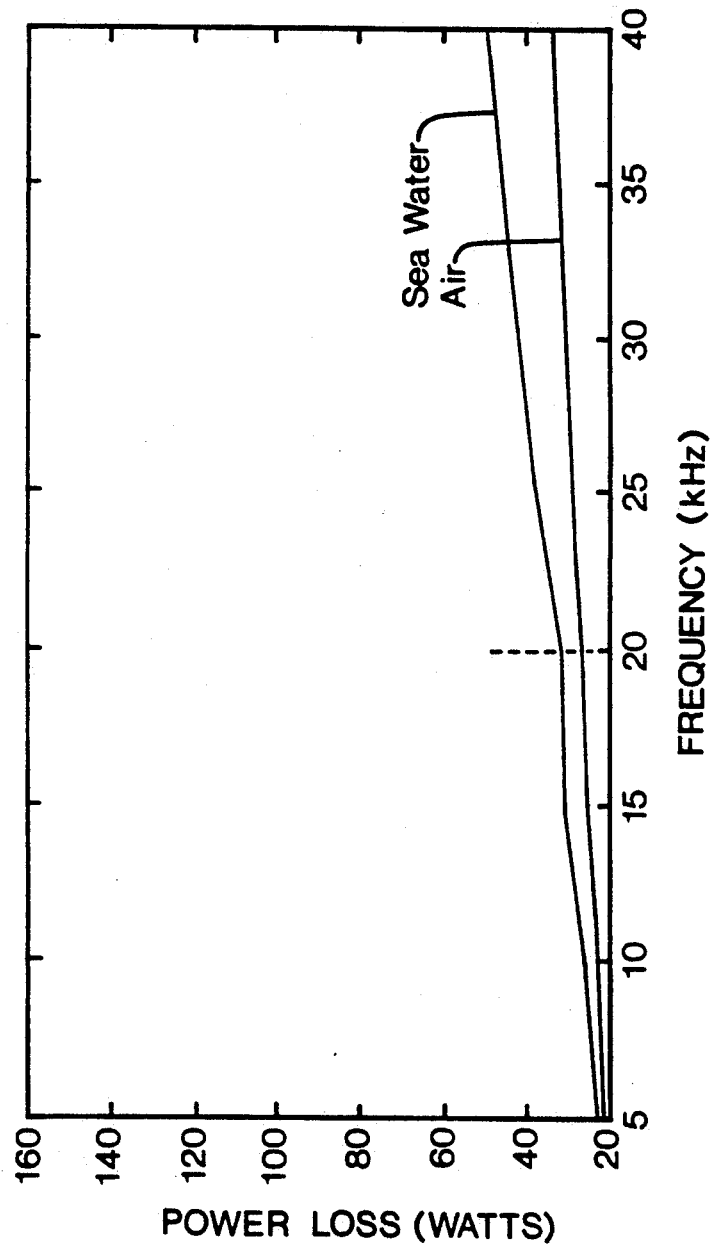
FIG. 22 is a graph of power loss versus frequency for the prototype system of FIG. 21.

To reduce these losses, preferably the secondary conductor 460 is encased or encapsulated in a shell 416 of a conformable, electrically insulative, waterproof material. When such a waterproof and electrically insulative shell surrounded the prototype conductor 460, the losses in sea water 404 at 20 kHz dropped to 33 watts, as shown in FIG. 22. For a 1000 watt output, these losses in sea water at 20 kHz, yield an efficiency of 96.8%. The losses in air at 20 kHz were measured at 27 watts, which for a 1000 watt output yield an efficiency of 97.4%. Thus, there is only about one half of one percent loss in efficiency using the submersible system 400 over the land-based system 30.

Using the insulated shell 416 to encase the link conductor 460, and at full sea water concentration, the prototype system 400 was operated at frequencies selected from a range of 5 kHz through 40 kHz. With the tank 402 empty, the prototype system 400 was also operated in air at frequencies selected from a range of 5 kHz through 40 kHz. The open-circuit power losses are plotted for the sea water and air tests over these frequencies in FIG. 22.

From these tests, the use of a high frequency power source with a highly reactive primary cable loop 40, 340 make a load resonant converter topology a preferred embodiment for the primary side converter 38, 338. The overall contactless power delivery system 30, as well as the submerged contactless system 300, appear to be viable, as well as economically and operationally attractive for use in a variety of systems.

I. Alternate Link Embodiments

Referring to FIG. 23, an alternate link member 58f constructed in accordance with the present invention has a generally rectangular cross-section. The link member 58f has a split-hinged core with two hinged core members 52f and 52f' joined together by hinge 152. In the illustrated embodiment, the link 50' includes a primary conductor 160, shown split into two components 160f and 160f'.

FIG. 24 illustrates an alternate embodiment of a link element 58g constructed in accordance with the present invention which includes three (3) core elements 52g, 52g', and 52g". In the illustrated embodiment, core elements 52g and 52g' are mirror images of one another which are joined together by a hinge 168. The primary conductor is split and includes conductor segments 160g and 160g'. The hinge 168 is optional since the core segments 52g and 52g' may be supplied as a single member united at the split adjacent hinge 168. Similarly, if hinge 168 is omitted, the primary Winding segments 160g and 160g' could also be a single unitary piece.

FIG. 25 illustrates a link member 58h constructed in accordance with the present invention which has a segmented core including core segments 52h and 52h'. A winding member 160h is secured to core segment 52h, and a another conductor 165 is supported from core segment 52h' by a support 172 of an insulative material. The insulative support 172 may be continuous, or a plurality of discrete members supporting the conductor 165 from the core member 52h'. Together, the conductor 165, the support 172, and the core segment 52h' may form a movable portion of the link 50, with a fixed portion formed by core segment 52h and primary conductor 160h, or visa versa.

J. Operation

Use of the present invention also offers several methods of transferring power from an electrical source to an electric load with relative motion therebetween. A method is also provided of delivering power between a first conductor and a second conductor, such as conductors 40 and 60 of FIGS. 1–4, without having direct electrical contact therebetween. The method includes the step of providing a first core-mounted conductor substantially surrounded by a core of a magnetic material. The first conductor has a passageway, such as that defined by the interwinding region 76, which is configured to receive the second conductor. The method includes the step of coupling the first conductor and core around a portion of the second conductor, and the step of energizing one of the first and second conductors to provide a current to the other of the first and second conductors to thereby transfer power between the first and second conductors.

In a preferred embodiment, the power is transferred at a high frequency, with the specific frequency chosen depending upon the desired application and desirable use of the selected power electronics. In another illustrated embodiment, the first conductor and core member are split so they may be hinged and opened to receive the second conductor and closed thereafter to substantially surround the second conductor. In another preferred embodiment, there may be relative motion between the core and the second conductor enclosed within the core and primary conductor. This relative movement may be linear and/or rotational with respect to the second conductor, and the power transfer may be from the first conductor to the second conductor or in the opposite direction. In a further preferred embodiment, multiple cores with first conductors are coupled to a single second conductor.

In operation, the underwater contactless delivery system 300 preferably uses a high-frequency converter for the primary converter 338. The primary conductor 340 is preferably an insulated cable or cable pair 340' and 340'', as illustrated in FIG. 17. The CWT pod link 350 preferably is designed with adequate clearance to prevent wearing of the insulation around conductor 340. Multiple submersible vehicles, such as the submarine 308 and the tracked vehicle 310, may each draw power from the primary conductor 340 by periodically clamping their CWT pod coupling link 350 around primary conductor 340. In FIG. 17, the tracked vehicle 310 is shown with its coupling link open while approaching conductor 340 for recharging.

Power received by the submarine 308 or vehicle 310 may be used to power the on-board ballast pump 315 for controlling the ascent or descent of the vehicle through the ocean 305. If designed with adequate clearance, the link 350 may remain coupled to conductor 340 to freely slide along its length during travel between the ocean surface 304 and the ocean floor 311 Remaining coupled during ascent and descent conserves energy stored in battery 314 for use in accomplishing mission objectives.

After descent, and upon reaching the ocean floor 311, for example, the tracked vehicle 310, disconnects link 450 from the primary conductor 340 to carry-out its mission. The vehicle 310 may be lowered from the boat by a crane or winch, rather than be equipped with ballast pumps. Since the submerged vehicle 310 and submarine 308 may periodically return to the cable 340 for recharging, theoretically, their missions may be extended almost indefinitely.

Having illustrated and described the principles of our invention with respect to several preferred embodiments, it should be apparent to those skilled in the art that our invention may be modified in arrangement and detail without departing from such principles. For example, other applications may be envisioned for employing the system described herein, as well as suitable material substitutions for the conductors and core, and dimensional variations for the components thereof, and the substitution of other devices and configurations known to be interchangeable by those skilled in the art. For instance, the flux collection or conduction surfaces adjacent a core gap, such as surfaces 84 and 84, of FIG. 5, need not be flat and need not be centered about a radius, but preferably only follow the same general contour with approximately the same normal distance therebetween. Furthermore, the primary and secondary converters may be as described, or other devices known to be interchangeable by those skilled in the art may be used. We claim all such modifications falling within the scope and spirit of the following claims.

We claim:

1. A submersible contactless power transfer system for transferring power from a power source to an electric load, comprising:
    a first conductor coupled to one of the power source or the electric load;
    a core-mounted submersible conductor coupled to the other of the power source or the electric load; and
    a submersible magnetic core supporting and surrounding a portion of the core-mounted conductor, with the core-mounted conductor and magnetic core surrounding a portion of the first conductor and submersed in a liquid for transferring power from the source to the load.

2. A submersible contactless power transfer system according to claim 1 wherein a portion of the first conductor is slidably received within the core-mounted conductor and magnetic core for relative motion therebetween, with power transfer continuing during the relative motion while submersed in the liquid.

3. A submersible contactless power transfer system according to claim 2 wherein:
    the first conductor has an axial length, a submerged portion submersed in the liquid, and a surface
    the surface portion of the first conductor is coupled to the power source.

4. A submersible contactless power transfer system according to claim 3 wherein:
   the relative motion occurs along the axial length of the first conductor; and
   the core-mounted conductor s coupled to the electric load for travel along the axial length of the first conductor.

5. A submersible contactless power transfer system according to claim 1 wherein the core-mounted conductor is encapsulated in a shell of a waterproof electrically insulative material.

6. A submersible contactless power transfer system according to claim 1, further including a first converter coupling the first conductor to the power source.

7. A submersible contactless power transfer system according to claim 6 wherein the first converter comprises a high frequency resonant converter.

8. A submersible contactless power transfer system according to claim 1 further including a second converter coupling the core-mounted conductor to the electric load.

9. A submersible contactless power transfer system according to claim 1 wherein:
   the first conductor has an axial length, a submerged portion submersed in the liquid, and a surface portion extending from the liquid, with the surface portion of the first conductor coupled to the power source;
   a portion of the first conductor is slidably received within the core-mounted conductor and magnetic core for relative motion along the axial length of the first conductor;
   the core-mounted conductor is coupled to the electric load for travel along the axial length of the first conductor, with power transfer continuing during said travel while submersed in the liquid;
   the core-mounted conductor is encapsulated in a shell of a waterproof electrically insulative material; and
   the system further includes a high frequency resonant converter coupling the first conductor to the power source, and a second converter coupling the core-mounted conductor to the electric load.

10. A submersible coupling link, comprising:
    a submersible sheath conductor for surrounding a portion of an elongate power conductor, the sheath conductor for coupling to an electric load submersed in a liquid; and
    a submersible magnetic core surrounding the sheath conductor to provide a flux path for a magnetic flux induced therein when the sheath conductor and core surround the power conductor, said magnetic flux inducing a current flow within the sheath conductor to deliver power from the power conductor to a load when coupled therewith.

11. A submersible coupling link according to claim 10 wherein the power conductor has an insulative cover layer, and the sheath conductor is sized to slidably move along the length of the power conductor.

12. A submersible coupling link according to claim 11 further including a shell of liquid impervious electrically insulative material encapsulating the sheath conductor.

13. A submersible coupling link according to claim 12 wherein the shell material is selected from one of the group consisting of a plastic, resin, teflon, rubber and synthetic elastomer.

14. A submersible coupling link according to claim 13 further including a core covering of an insulative durable material surrounding the core 15. A submersible coupling link according to claim 10 wherein the sheath conductor and the core are each split into first and second segments which are openable for disengaging the power conductor and closable for engaging the power conductor for power transfer therebetween.

16. A method of delivering power from a power source to a first electric load submersed in a liquid, comprising the steps of:
    powering an elongate conductor at least partially submerged in the liquid and coupled to the power source;
    providing the submersed first electric load with a coupling link having a sheath conductor surrounded by a magnetic core, the sheath conductor electrically coupled to the first load; and
    surrounding a portion of the elongate conductor with the sheath conductor and core to deliver power by magnetic induction from the elongate conductor to the first load.

17. A method of delivering power according to claim 16 further including the steps of:
    providing the first load with a power storage device and a propulsion unit selectively powerable by the power storage device;
    periodically charging the power storage device of the first load by coupling the link of the first load to the elongate conductor;
    decoupling the link of the first load from the elongate conductor; and
    propelling the first load through the liquid using the propulsion unit when decoupled from the elongate conductor.

18. A method of delivering power according to claim 17 further including the step of illuminating a submerged portion of the elongate conductor by powering lights with power from the elongate conductor.

19. A method of delivering power according to claim 17 to the first electric load and a second electric load submersed in the liquid, further including the steps of:
    providing the second load with a power storage device and a propulsion unit selectively powerable thereby;
    providing the second load with a coupling link having a coupling link comprising a sheath conductor surrounded by a magnetic core, the sheath conductor electrically coupled to the second load;
    periodically charging the power storage device of the second load by coupling the link of the second load to the elongate conductor;
    decoupling the link of the second load from the elongate conductor;
    propelling the second load through the liquid using the propulsion unit when decoupled from the elongate conductor.

20. A method of delivering power according to claim 16 wherein:
    the power source is located out of the liquid;
    the powering step comprises powering an elongate conductor having one portion submerged and another portion coupled to the power source; and
    the method further including the steps of slidably moving the first load coupling link along the submerged portion of the elongate conductor during power delivery.

* * * * *